US011475268B2

(12) United States Patent
Garcia

(10) Patent No.: US 11,475,268 B2
(45) Date of Patent: Oct. 18, 2022

(54) APPARATUS AND METHODS FOR GENERATING CONTEXT-AWARE ARTIFICIAL INTELLIGENCE CHARACTERS

(71) Applicant: Intel Corporation, Santa Clara, CA (US)

(72) Inventor: Jason Garcia, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 51 days.

(21) Appl. No.: 16/921,473

(22) Filed: Jul. 6, 2020

(65) Prior Publication Data
US 2020/0401868 A1    Dec. 24, 2020

Related U.S. Application Data

(63) Continuation of application No. 16/132,667, filed on Sep. 17, 2018, now Pat. No. 10,706,347.

(51) Int. Cl.
*G06N 3/00* (2006.01)
*G06N 5/02* (2006.01)
(Continued)

(52) U.S. Cl.
CPC .............. *G06N 3/006* (2013.01); *G06N 5/02* (2013.01); *G06N 20/00* (2019.01); *G06T 13/40* (2013.01)

(58) Field of Classification Search
CPC .......... G06N 3/006; G06N 20/00; G06N 5/02; G06N 3/00; G06N 3/08; G06N 7/005;
(Continued)

(56) References Cited

U.S. PATENT DOCUMENTS 8,972,265 B1    3/2015  Lester
9,324,318 B1    4/2016  Bunn et al.
(Continued)

OTHER PUBLICATIONS

United States Patent and Trademark Office, "Non-Final Office action," issued in connection with U.S. Appl. No. 15/826,149, dated May 15, 2019, 15 pages.
(Continued)

*Primary Examiner* — Xilin Guo
(74) *Attorney, Agent, or Firm* — Hanley, Flight & Zimmerman, LLC

(57) ABSTRACT

Example apparatus and methods for generating context-aware artificial intelligence characters are disclosed. An example apparatus to animate an artificial intelligence character includes a data tagger to tag data in a media data stream to generate a plurality of data files of tagged data, the data files corresponding to different time periods in a storyline, the tagged data associated with a first character in the media data stream, the artificial intelligence character to portray the first character. The example apparatus includes a trainer to generate a response model of the first character based on the data file corresponding to a current data time period and one or more data files corresponding to one or more earlier time periods of the storyline and a response generator to apply the response model based on a stimulus input to animate the artificial intelligence character.

26 Claims, 8 Drawing Sheets

(51) Int. Cl.
*G06T 13/40* (2011.01)
*G06N 20/00* (2019.01)
(58) Field of Classification Search
CPC .................. G06N 3/008; G06T 13/40; G06T 2207/20081; G06T 7/20; G06K 9/6256; G06K 9/6267
See application file for complete search history.

(56) References Cited

U.S. PATENT DOCUMENTS

| | | | |
|---|---|---|---|
| 9,607,612 | B2 | 3/2017 | Deleeuw |
| 9,772,994 | B2 | 9/2017 | Karov et al. |
| 9,837,069 | B2 | 12/2017 | Shamir et al. |
| 10,022,628 | B1 | 7/2018 | Matsumiya et al. |
| 10,127,224 | B2 | 11/2018 | Deleeuw |
| 10,217,458 | B2 | 2/2019 | Mangalath et al. |
| 10,255,909 | B2 | 4/2019 | Hofer et al. |
| 10,339,935 | B2 | 7/2019 | Cilingir et al. |
| 10,424,299 | B2 | 9/2019 | Lawrence et al. |
| 10,540,975 | B2 | 1/2020 | Begum et al. |
| 10,573,301 | B2 | 2/2020 | Kupryjanow et al. |
| 10,600,404 | B2 | 3/2020 | Garcia |
| 10,642,881 | B2 | 5/2020 | Singh et al. |
| 10,657,952 | B2 | 5/2020 | Hofer et al. |
| 10,706,347 | B2 | 7/2020 | Garcia |
| 10,726,858 | B2 | 7/2020 | Germain et al. |
| 2002/0161882 | A1 | 10/2002 | Chatani |
| 2003/0028380 | A1 | 2/2003 | Freeland et al. |
| 2003/0078780 | A1 | 4/2003 | Kochanski et al. |
| 2004/0059577 | A1 | 3/2004 | Pickering |
| 2004/0148172 | A1 | 7/2004 | Cohen et al. |
| 2005/0065795 | A1 | 3/2005 | Mutsuno et al. |
| 2008/0183473 | A1 | 7/2008 | Nagano et al. |
| 2008/0319752 | A1 | 12/2008 | Kuo et al. |
| 2009/0037179 | A1 | 2/2009 | Liu et al. |
| 2010/0042410 | A1 | 2/2010 | Stephens, Jr. |
| 2010/0182326 | A1 | 7/2010 | Goldfarb |
| 2013/0282747 | A1 | 10/2013 | Cheng et al. |
| 2013/0289998 | A1 | 10/2013 | Eller et al. |
| 2013/0329011 | A1 | 12/2013 | Lee et al. |
| 2015/0356767 | A1 | 12/2015 | Suma et al. |
| 2016/0210602 | A1 | 7/2016 | Siddique et al. |
| 2016/0365087 | A1 | 12/2016 | Freud |
| 2017/0039751 | A1 | 2/2017 | Tong et al. |
| 2017/0053538 | A1 | 2/2017 | Samarasekera et al. |
| 2017/0177090 | A1 | 6/2017 | Anderson |
| 2017/0177716 | A1 | 6/2017 | Perez et al. |
| 2018/0005435 | A1 | 1/2018 | Anderson et al. |
| 2018/0089583 | A1 | 3/2018 | Iyer et al. |
| 2018/0096259 | A1 | 4/2018 | Andrews et al. |
| 2018/0120947 | A1 | 5/2018 | Wells et al. |
| 2018/0133900 | A1 | 5/2018 | Breazeal et al. |
| 2018/0165596 | A1* | 6/2018 | Abrams .................. G06N 5/04 |
| 2018/0176506 | A1 | 6/2018 | McNelley et al. |
| 2018/0182373 | A1 | 6/2018 | Almudafar-Depeyrot et al. |
| 2018/0189568 | A1 | 7/2018 | Powderly et al. |
| 2018/0349354 | A1 | 12/2018 | Gonzalez et al. |
| 2018/0349794 | A1 | 12/2018 | Georges et al. |
| 2018/0352293 | A1 | 12/2018 | Wu et al. |
| 2019/0005699 | A1 | 1/2019 | Anderson |
| 2019/0042908 | A1 | 2/2019 | Garcia |
| 2019/0043472 | A1 | 2/2019 | Garcia |
| 2019/0043474 | A1* | 2/2019 | Kingsbury ............. G06N 3/006 |
| 2019/0214021 | A1 | 7/2019 | Pearce |
| 2020/0051306 | A1 | 2/2020 | Park et al. |
| 2020/0243069 | A1 | 7/2020 | Amores et al. |

OTHER PUBLICATIONS

Serban et al., "Building End-to-End Dialogue Systems Using Generative Hierarchical Neural Network Models," published in AAAI 2016 (Special Track on Cognitive Systems) (2016), 8 pages.

Chaquet et al., "A Survey of Video Datasets for Human Action and Activity Recognition," Computer Vision and Image Understanding vol. 117, 2013, pp. 633-659, 27 pages.

Wampler et al., "Generalizing Locomotion Style to New Animals With Inverse Optimal Regression," ACM Transactions on Graphics (TOG), vol. 33, Issue 4, Jul. 2014, available at https://grail.cs.washington.edu/projects/inverse_locomotion/paper/animal_-motion_joint_inverse.pdf, 11 pages.

Lim et al., "Fuzzy Human Motion Analysis: A review," Pattern Recognition, 2015, pp. 1773-1796, 24 pages.

United States Patent and Trademark Office, "Notice of Allowance," issued in connection with U.S. Appl. No. 15/826,149, dated Nov. 12, 2019, 7 pages.

United States Patent and Trademark Office, "Final Office Action," issued in connection with U.S. Appl. No. 15/638,796, dated Feb. 11, 2019, 16 pages.

United States Patent and Trademark Office, "Non-Final Office Action," issued in connection with U.S. Appl. No. 15/638,796, dated Oct. 15, 2018, 13 pages.

United States Patent and Trademark Office, "Notice of Allowance," issued in connection with U.S. Appl. No. 16/132,667 dated Feb. 26, 2020, 9 pages.

United States Patent and Trademark Office, "Non-Final Office Action" issued in connection with U.S. Appl. No. 16/132,667 dated Nov. 13, 2019, 22 pages.

* cited by examiner

APPARATUS AND METHODS FOR GENERATING CONTEXT-AWARE ARTIFICIAL INTELLIGENCE CHARACTERS

RELATED APPLICATION

This patent arises from a continuation of U.S. patent application Ser. No. 16/132,667 (now U.S. Pat. No. 10,706, 347), which was filed on Sep. 17, 2018. U.S. patent application Ser. No. 15/534,750 is hereby incorporated herein by reference in its entirety. Priority to U.S. patent application Ser. No. 16/132,667 is hereby claimed.

FIELD OF THE DISCLOSURE

This disclosure relates generally to artificial intelligence, and, more particularly, to methods and apparatus for generating context-aware artificial intelligence characters.

BACKGROUND

Artificial intelligence (AI) characters can be used as part of an interactive user experience involving virtual reality or augmented reality. AI characters are artificial personalities that facilitate communication between a human and a computer. For example, interactive video experiences can include AI characters that respond to user inputs as part of an immersive storytelling experience. In another context, AI characters can serve as personal virtual assistants (e.g., Siri® by Apple®, Inc., Cortana® by Microsoft® Corp.) that provide on-demand responses to user inputs, such as questions about location, world history, etc.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
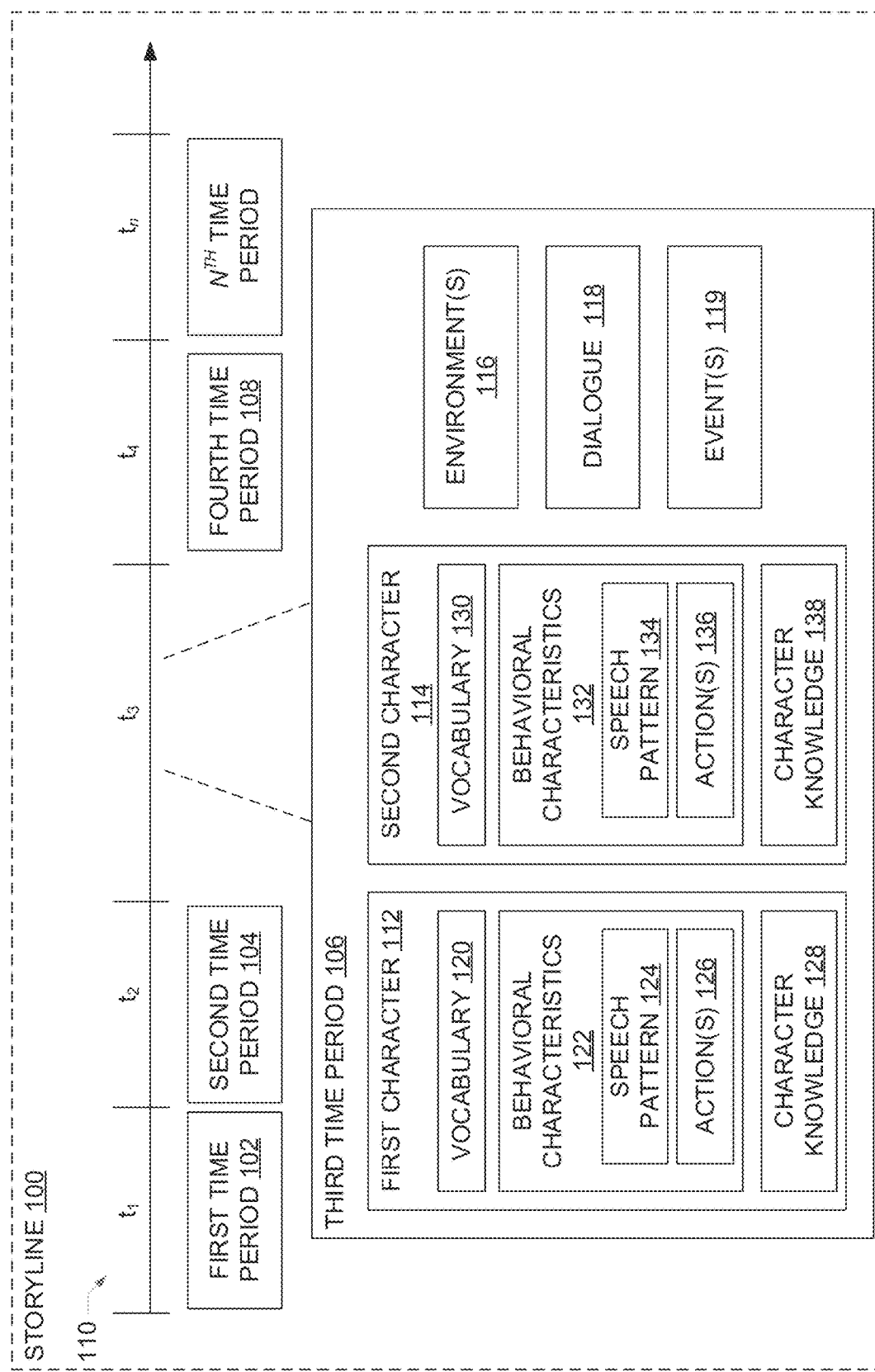
FIG. 1 is a graphical depiction of an example storyline.

Artificial intelligence (AI) characters are artificial personalities that facilitate communication between a human and a computer. For example, AI characters facilitate user interaction with audio and/or video experiences, such as storytelling (e.g., video games) and personal digital assistance (e.g., Siri® by Apple®). For instance, an animated AI character in an interactive video game can respond to user inputs, such as a user input directing the AI character to pick up an object, to choose a certain door to open, etc. As another example, a virtual assistant associated with a user device such as a smartphone can provide on-demand information in response to user inquires as to the user's location, can provide reminders, etc.

Typically, an AI character is associated with a particular personality that defines, for instance, the AI character's voice and speech pattern when providing an audio output. As a result, the audio output may be presented in the same voice or speech pattern (e.g., a monotone voice) regardless of the emotional context of the input or output content. Thus, the AI character may say a funny phrase in the same voice as a historical fact. Further, although a user may be able to switch the AI character's personality by selecting, for instance, a different type of voice output, such options are limited with respect to sounds, phrases, etc.

In examples in which the AI character is graphically portrayed as in a video game, the AI character can perform movements that visualize the AI character's response to the user inputs. In some examples, the movements performed by the AI character are connected with particular emotions that the AI character is expressing. For example, the AI character may always smile to express the emotion of happiness and/or excitement. However, a singular physical action, speech pattern, or voice by an AI character does not accurately reflect an interaction that a user would expect when interacting with another human. For instance, a human may exhibit a range of different actions in response to being excited, such as smiling, clapping, jumping up and down, etc.

Some known AI characters portray characters from fictional worlds, such as Merlin (the magician for King Arthur's court), Tinker Bell, etc. In some examples, the AI characters are provided with data knowledge of, for instance, the fictional world in which the AI character is disposed (e.g., Camelot for Merlin). This knowledge typically includes the facts of the overarching storyline with little or no temporal context to the storyline. For example, an AI character portraying Merlin is provided with the information that Merlin is a wizard. However, the Merlin AI character is not provided with information that when Merlin was eight years old, he did not know he was a wizard, but when he was eleven years old, he did know he was a wizard. Such conditional timeline knowledge is important for an AI character in a story having a defined timeline, as this knowledge affects how the character being mimicked by the AI character would respond at different times in a storyline.

Example systems and methods disclosed herein provide for training of audio- and/or visual-based AI characters to enable the AI character to respond to a stimulus input (e.g., a user input) with specific behaviors (e.g., speech patterns, movements) that are specific to a character being portrayed by the AI character, such as fictional character (e.g., Merlin), a historical character (e.g., George Washington), a celebrity, etc. Examples disclosed herein account for contextual variables such as an emotional context associated with the user input and/or AI character output or an environmental context in which the AI character is acting when determining a response that should be output via the AI character (e.g., via animation). As a result, user interaction with the AI character more realistically reflects the user's expectations for the context in which the interaction occurs and/or is consistent with a storyline in which character being portrayed is associated.

Examples disclosed herein identify a range of behavioral parameters portrayed by the AI character based on a plurality of video, audio, or textual media sources associated with (e.g., including, informing, etc.) the portrayed character (e.g., films, television episodes, books). Examples disclosed herein identify data from the media to generate data files (e.g., XML documents) including hierarchical levels or classes of data labeled with respect to, for instance, character actions, emotions, and/or dialogue that occur in the media. Examples disclosed herein use datasets derived from the data files to train a contextual response manager to recognize a range of emotional and/or physical responses associated with the portrayed character (e.g., for a particular emotion such as happiness, at a particular stage in life such a childhood, etc.). Based on the training, the contextual response manager outputs instructions that cause the AI character to take an audio and/or visual action (e.g., a response) that appropriately mimics how the character acts, what content the character would say, and how the character would say the content in the current context of the storyline. In some examples, based on the training with respect to the range of the character behaviors, the contextual response manager outputs ad hoc or varied responses in response to different user inputs to provide for more realistic user interactive AI experiences. For example, the contextual response manager may instruct the AI character to smile to express happiness in response to a first user input and to clap and laugh to express happiness in response to a second user input.

Some examples disclosed here identify data to be included and labeled in the data files (e.g., XML documents) from one or more portions of the media sources using techniques such as automated speech detection to convert audio to text, tag the speech content, and build a library of data including words and phrases to be output by the AI-enabled character at different times relative to the storyline, in view of different emotions associated with the content of the input and/or output, etc. Some examples disclosed herein identify and tag data indicative of physical behaviors exhibited by a character in the media in the data files, such as facial expressions, movements, and emotion-based body language (e.g., arms crossed, nail biting) to build a data library of physical responses that may be performed by the AI-enabled character. Some examples disclosed herein tag scene level information data, such as character age, year in which the scene is to take place, etc. to associate the character behavior, including speech and/or actions, and/or character knowledge with particular timelines and/or circumstances appropriate to the timelines. Using datasets that includes one or more types of data identified from the media (e.g., action data, scene information), examples disclosed train the contextual response manager to create models with respect to what content the character should say, how the character should say the content, and what actions the character should perform and different points in the storyline to take into account the developing knowledge and/or character of the AI character. As a result, when the contextual response manager receives a user input, the contextual response manager uses the model(s) to dynamically generate character-, situational-, and/or timeline-specific actions, speech, reactions, and/or responses to be exhibited by the AI character.

FIG. 1 is a graphical depiction of an example storyline 100. The storyline 100 may be implemented via one or more media types such as a film, a television episode, a novel, a commercial, an advertisement, a short story, radio, etc. The storyline 100 is made up of a plurality of time periods in which one or more portions of a plot of the storyline occur. The time periods can correspond to scenes, video frames or segments, audio clips, chapters, acts of a play or other story, etc. The example storyline 100 of FIG. 1 includes a first time period 102, a second time period 104, a third time period 106, a fourth time period 108. The example storyline can include more or fewer time periods. Specifically, the storyline 100 may include any number N of time periods. In the example of FIG. 1, the first, second, third, and fourth time periods 102, 104, 106, 108 of the storyline are associated with a linear timeline 110 with time progressing from left to right so that the left side of the timeline is earlier in time than the right side of the timeline. For instance, the first time period 102 is associated with a first time $t_1$ and the second time period 104 is associated with a second time $t_2$ occurring after the first time $t_1$. In some examples, the time periods can cover particular days, months, or years. In some other examples, the time periods are associated with fictional timelines such as a fictional calendar in a science fiction storyline where a length of a season is based on arrival and departure of an extraterrestrial creature. In some examples, the time periods are associated with a particular event (e.g., a battle).

Although in the example of FIG. 1, the time periods 102, 104, 106, 108 are associated with the linear timeline 110, in other examples, the time periods 102, 104, 106, 108 are associated with a non-linear timeline in that the time periods 102, 104, 106, 108 are presented out of sequence as the storyline 100 progresses. For example, the first time period 102 can include portions of the plot of the storyline 100 that occur in present day, while the second and third time periods 104, 106 include portions of the plot that occur in the past (i.e., before the portions of the plot occurring in the first time period 102). In such examples, times $t_2$ and $t_3$ of the timeline 110 represent time occurring before time $t_1$. The fourth time period 104 can include portions of the plot that occur in the present day after the portions of the plot presented the first time period 102. In other examples, the first, second, third, and fourth time periods 102, 104, 106, 108 are not associated with a particular sequence (e.g., events associated with the respective portions are independent of one another and/or not related).

For illustrative purposes, the third time period 106 of the storyline 100 is shown in detail in FIG. 1. As an example, the third time period 106 can represent a scene in a movie presenting the storyline 100. The third time period 106 includes a first character 112 (e.g., Merlin) and a second character 114 (e.g., King Arthur) acting in one or more environments 116 (e.g., Camelot). The first and second characters 114 exchange dialogue 118 over the course of the third time period 106 of the storyline 100. One or more events 119 (e.g., a battle) can occur during the course of the storyline 100.

The first character 112 is associated with a vocabulary 120 and behavioral characteristics 122 specific to the third time period 106. The vocabulary 120 includes the words and phrases spoken by the first character 112. The behavioral characteristics 122 include a speech pattern 124 of the first character 112 specific to the third time period 106, which can include speech characteristics such as stuttering, word repetition, dramatic pauses, inflections, etc. The behavioral characteristics 122 for the first character 112 can include actions 126 performed by the first character 112 over the course of the third time period 106, such as running, jumping, smiling, etc. The vocabulary 120 and/or the behavioral characteristics 122 of one time period (e.g., the third time period 106) may be different than the vocabulary 120 and/or behavioral characteristics 122 of the same character 112 in a different time period (e.g., the first time period 102) representing changes in knowledge, maturity, behaviors, and/or abilt(ies) that may be accumulated over time.

In the example of FIG. 1, the first character 112 is also associated with character-specific knowledge 128. For example, in the storyline 100 with a linear timeline, the first character 112 may know about the event 119 (e.g., the battle) and event(s) occurring prior to the third time period 106 (e.g., event(s) occurring during the first time period 102 and/or the second time period 104).

The second character 114 is associated with a respective vocabulary 130 and behavioral characteristics 132 including a speech pattern 134 and action(s) 136 that at least partially differ from the vocabulary 120 and/or the behavioral characteristics 122 associated with the first character 112. The second character 114 is also associated with character knowledge 138, which can differ or partially differ from a scope of the character knowledge 128 associated with the first character 112 (e.g., the second character 114 may know about more or less events than the first character 112).

In some examples, the character knowledge 128, 138 of the first and second characters 112, 114 is based on a linear sequence of the storyline 100. For example, the character knowledge 128 of the first character 112 in the third time period 106 is limited to events associated with the first, second, and/or third periods 102, 104, 106 at times $t_1$, $t_2$, and $t_3$ and not events occurring during later portions of the storyline 100 (e.g., the fourth time period 108). However, in examples in which the time periods 102, 104, 106, 108 are out of order in the storyline 100, the first character 112 may know about both events occurring in the third time period 106 (e.g., present day) and events occurring in the fourth time period 108 (e.g., a flashback of events that occurred before the events of the third time period 106). Of course, certain base knowledge may be common to all persons (e.g., gravity causes apples to fall from trees).

In some examples, the first character 112 and/or the second character 114 may be implemented as AI character(s) in an interactive AI experience, such as a video game, video, and/or audiobook in which a user can interact with the AI character(s) by providing user inputs (e.g., commands or other stimulus) to which the AI character(s) respond.

The example storyline 100 of FIG. 1 is not limited to a fictional storyline such as Camelot and the character(s) 112, 114 are not limited to fictional characters such as Tinker Bell. Rather, the example storyline 100 can correspond to content from history and/or current events and the character(s) 112, 114 can be real person(s) such as historical figure(s) (e.g., George Washington, Martin Luther King), celebrities (e.g., Oprah Winfrey, Paul McCartney), and athletes (e.g., Tom Brady, Muhammad Ali). Thus, for example, the vocabulary 120, 130 and the behavioral characteristics 122, 132 of FIG. 1 can represent vocabulary and behavioral characteristics of a real person and can be based on dialogue spoken by the real person as documented in, for example, a video interview. The character knowledge 128, 182 can represent a personal history of the real person and the events 119 of FIG. 1 can represent real-world events (e.g., wars).

Thus, as used herein, the term "storyline" can refer to fictional plots or historical and/or current happenings in the real world, the term "character" can refer to fictional or non-fictional personalities, and the phrase "time period" can refer to real-world time periods (e.g., 24-hour days, the month of January followed by the month of February) or fictional time periods (e.g., a length of day controlled by a mystical creature).

Figure 2:
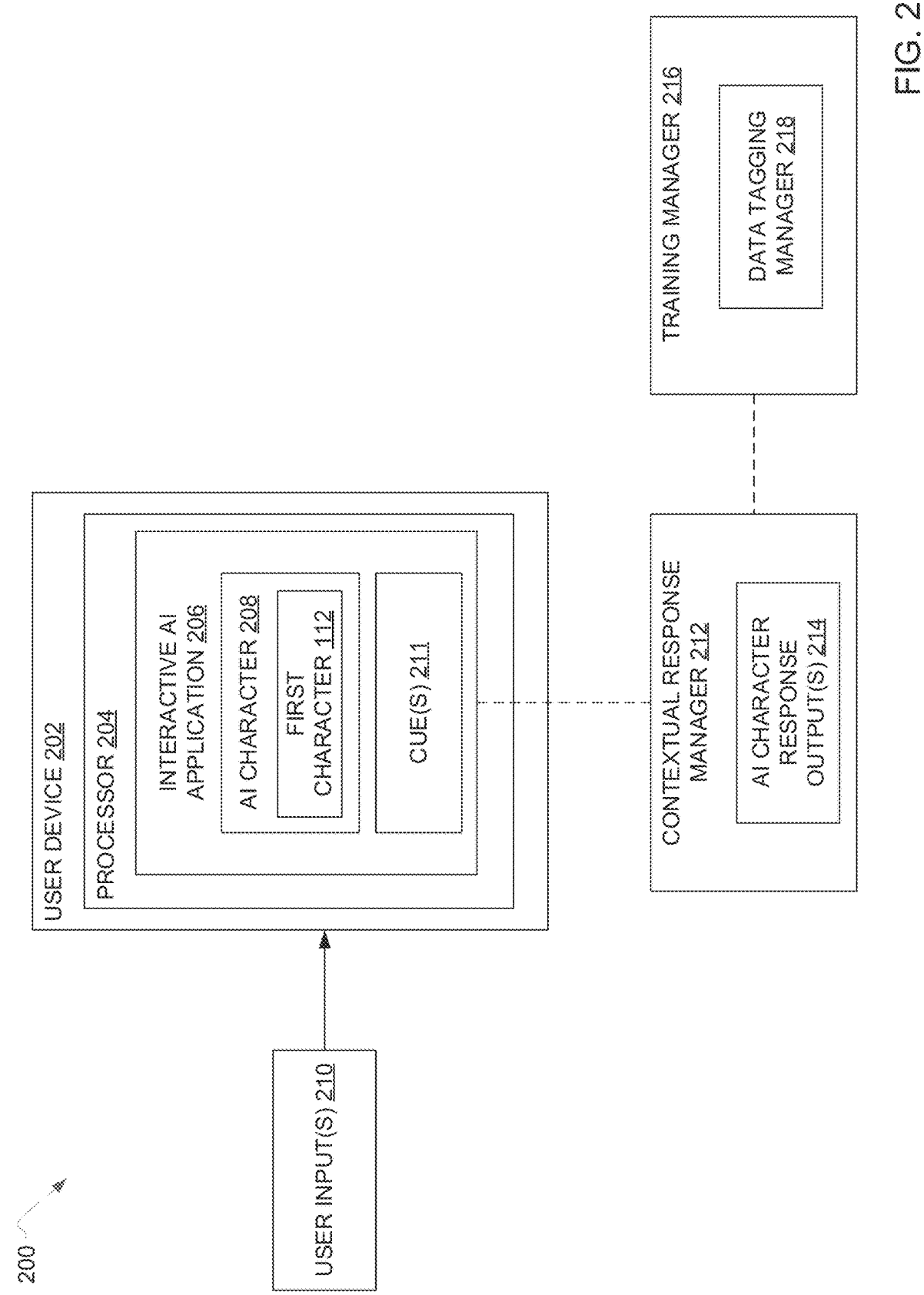
FIG. 2 illustrates an example system including an example training manager and an example contextual response manager for analyzing the example storyline of FIG. 1 to provide an artificial intelligence character interaction in accordance with teachings disclosed herein.

FIG. 2 illustrates an example system 200 including a user device 202. The user device 202 includes a processor 204 to execute an interactive AI application 206. The user device 202 can be implemented by one or more of a smartphone, a laptop, an electronic tablet, a television, etc. In some examples, the interactive AI application 206 includes a personal digital assistance application that is executed via a smartphone or other user device 202 (e.g., Amazon® Echo®) to provide service(s) to the user such as ordering capabilities (e.g., order a pizza), information (e.g., user location and/or directions, information about a specific subject), and/or other functionality (e.g., music, time information, calendar information, etc.).

The example interactive AI application 206 of FIG. 2 includes an AI character 208. In the example of FIG. 2, the AI character 208 portrays (e.g., depicts, mimics) the first character 112 of the example storyline 100 of FIG. 1 (e.g., Merlin, George Washington). In other examples, the AI character 208 portrays another character of the storyline 100, such as the second character 114. The AI character 208 can implement another personality (e.g., a virtual assistant such as Siri®) or another fictional or non-fictional character (e.g., an AI character portraying John Adams) that is or is not associated with example storyline 100 of FIG. 1. Also, the example AI application 206 can portray two or more AI characters.

In the example of FIG. 2, a user interacts with the interactive AI application 206 by providing one or more user inputs 210 via the user device 202. The user input(s) 210 can include, for instance, audio input(s) received via speakers of the user device 202 (e.g., user speech) and/or input(s) entered via a keyboard and/or a touch screen of the user device 202. In response to the user input(s) 210, the AI character 208 performs one or more actions and/or outputs one or more audio responses.

The AI character 208 can also receive one or more cues 211 from the interactive AI application 206 that cause the AI character 208 to respond to the cue(s) 211 by performing an action, speaking, etc. Example cue(s) 211 can include an object presented in the environment in which the AI character is located (e.g., a chair) and/or the presence of another character that triggers a response from the AI character 208.

In the example of FIG. 2, the user input(s) 210 and/or the cue(s) 211 (both of which are generally referred herein as "stimulus input(s)") are analyzed by a contextual response manager 212. The example contextual response manager 212 of FIG. 2 determines one or more responses 214 to animate the AI character 208 to the user input(s) 210 and/or cue(s) 211. For example, the contextual response manager 212 determines the content that the AI character should say in response to the user input(s) 210, how the user should say the content (e.g., with respect to speech pattern), and/or what movements the AI character should perform. In the example of FIG. 2, the example contextual response manager 212 determines the response output(s) 214 of the AI character 208 based on one or more characteristics of the first character 112 that the AI character 208 portrays, such as the speech pattern associated with the first character 112 (e.g., the speech pattern 124 of FIG. 1).

The example contextual response manager 212 can be implemented by the processor 204 of the user device 202. In other examples, the contextual response manager 212 is implemented by one or more cloud-based devices, such as one more servers, processors, and/or virtual machines located remotely from the user device 202. In other examples, some of the analysis performed by the contextual response manager 212 is implemented by cloud-based devices and other parts of the analysis are implemented by local processor(s) or one or more user device(s).

In the example of FIG. 2, the contextual response manager 212 executes one or more learned models to determine the AI character response output(s) 214. The example contextual response manager 212 of FIG. 2 is trained by a training manager 216 using machine learning technique(s) (e.g., supervised learning) and based on training dataset(s) generated from media that includes the first character 112. The example training manager 216 of FIG. 2 includes a data tagging manager 218. The example data tagging manager 218 generates the training datasets based on data identified from media sources associated with the first character 112, such as television episodes, books, radio broadcasts, newspaper interviews, podcasts, etc. The example training manager 216 uses the datasets to generate machine learning model(s) that are used by the contextual response manager 212 to recognize characteristics of the first character 112, such as different speech patterns exhibited by the first character 112 when the first character 112 expresses the emotions of excitement versus anger. The contextual response manager 212 uses the machine learning model(s) to generate contextually appropriate AI character response output(s) 214 that accurately represent the expected responses of the first character 112 in different situations and to different user input(s) 210 and/or cue(s) 211 in the context of a particular point in time of the storyline.

In some examples, the data tagging manager 218 analyzes the media sources with respect to a storyline associated with (e.g., including) the first character 112 (e.g., the first storyline 100 of FIG. 1) to identify one or more parameters of the storyline and/or characteristics of the first character 112. For each time period of the storyline analyzed (e.g., the time period(s) 102, 104, 106, 108 of the storyline 100 of FIG. 1), the data tagging manager 218 generates a data file including (1) data identified in the time period and (2) corresponding labels tagging the data as associated with, for instance, a character action, character vocabulary, scene information, etc. The file(s) generated by the data tagging manager 218 can include XML documents that use XML tags to contextually label the data identified in the time period.

For instance, referring to FIG. 1, for each of the first, second, third, and fourth time periods 102, 104, 106, 108 of the storyline 100, the data tagging manager 218 generates a data file including one or more of the following types of example data:

(1) Data corresponding to the dialogue 118 spoken by the first character 112 and/or the second character 114 (e.g., the words and/or phrases spoken), which is tagged as dialogue data in the data file;

(2) Data describing the environment(s) 116 in which the first character 112 and/or the second character 114 is located, which is tagged or labeled as environment data in the file;

(3) Emotion(s) associated with the dialogue 118 based on, for instances, keywords in the dialogue 118 indicating different emotions. The emotion data can include descriptions of the emotions (e.g., words describing emotions such as "happy") and corresponding labels identifying the description as emotion data in the file in connection with the dialogue data;

(4) Data identifying the action(s) 126, 136 performed by the first character 112 and/or the second character 114 during the respective time periods 102, 104, 106, 108 of the storyline 100. The action data can include descriptions of the action(s) (e.g., "jumping") and corresponding labels identifying the descriptions as action data in the date file; and (5) Scene level information for the respective time periods 102, 104, 106, 108, such as the age of the first character 112 and/or the second character 114, the date that the scene(s) of the storyline 100 in the respective time periods 102, 104, 106, 108, etc.

The data files generated by the data tagging manager 218 can include additional or fewer items of data. Thus, the documents created by the data tagging manager 218 include tagged data that represent the storyline 100. As explained herein, the data in the data file(s) can be searched to form datasets that represent the characteristics of the character(s) 112, 114 of the storyline 100 and/or parameters of the storyline 100 such as environment(s) in which the story takes place.

The data file(s) generated by the example data tagging manager 218 of FIG. 2 are stored in a database. The training manager 216 searches the database for tagged data in the files that satisfy one or more search parameters, such as phrases spoken by the first character 112 when he is happy, movements performed by the first character 112 when the first character 112 is in a certain environment, all events that the first character 112 experienced up to a certain character age, etc. The results of the database search include dataset(s) containing the tagged data from the XML files corresponding to the search parameters. For example, a search for events experienced by the first character 112 up to age 12 may result in a first dataset that includes data tagged as event data from the XML files generated for the first and second time periods 102, 104 of FIG. 1, which a search for events experienced by the first character 112 up to age 20 may result in a second dataset that includes event data from the XML documents generated for the first, second, and third time periods 102, 104, 106 of FIG. 1.

The training manager 216 trains the contextual response manager 212 using the different datasets to teach the contextual response manager 212 what words and/or phrases the AI character 208 should say in response to certain inputs, how the AI character 208 should say the words and/or phrases, what movement(s) the AI character 208 should perform, etc. The training manger 216 generates one or more machine learning models that define, for example, what content the AI character 208 should say when portraying the emotion of excitement based on the training using dataset(s) including dialogue data associated with emotion data labeled as indicating excitement for one or more time periods of the storyline. The contextual response manager 212 uses the learned models to generate the AI character response output(s) 214 that enable the AI character 208 to respond to the user input(s) 210 and/or the application cue(s) 211. For instance, continuing to refer to the example in which the AI character 208 is to output dialogue indicative of excitement, the contextual response manager 212 executes the model built based on the dialogue data and emotion data for excitement to determine (e.g., select) a word to be output by the AI character 208 that indicates excitement (e.g., "wow!").

The example training manager 216 can be implemented by the processor 204 of the user device 202. In other examples, the training manager 216 is implemented by one or more cloud-based devices, such as one more servers, processors, and/or virtual machines. In other examples, some of the analysis performed by the training manager 216 is implemented by cloud-based devices and other parts of the analysis are implemented by processor(s) or one or more user device(s). The processor(s) and/or cloud-based device(s) that are used to implement the training manager 216 can be the same or different as the processor(s) and/or cloud-based device(s) used to implement the contextual response manager 212.

Figure 3:
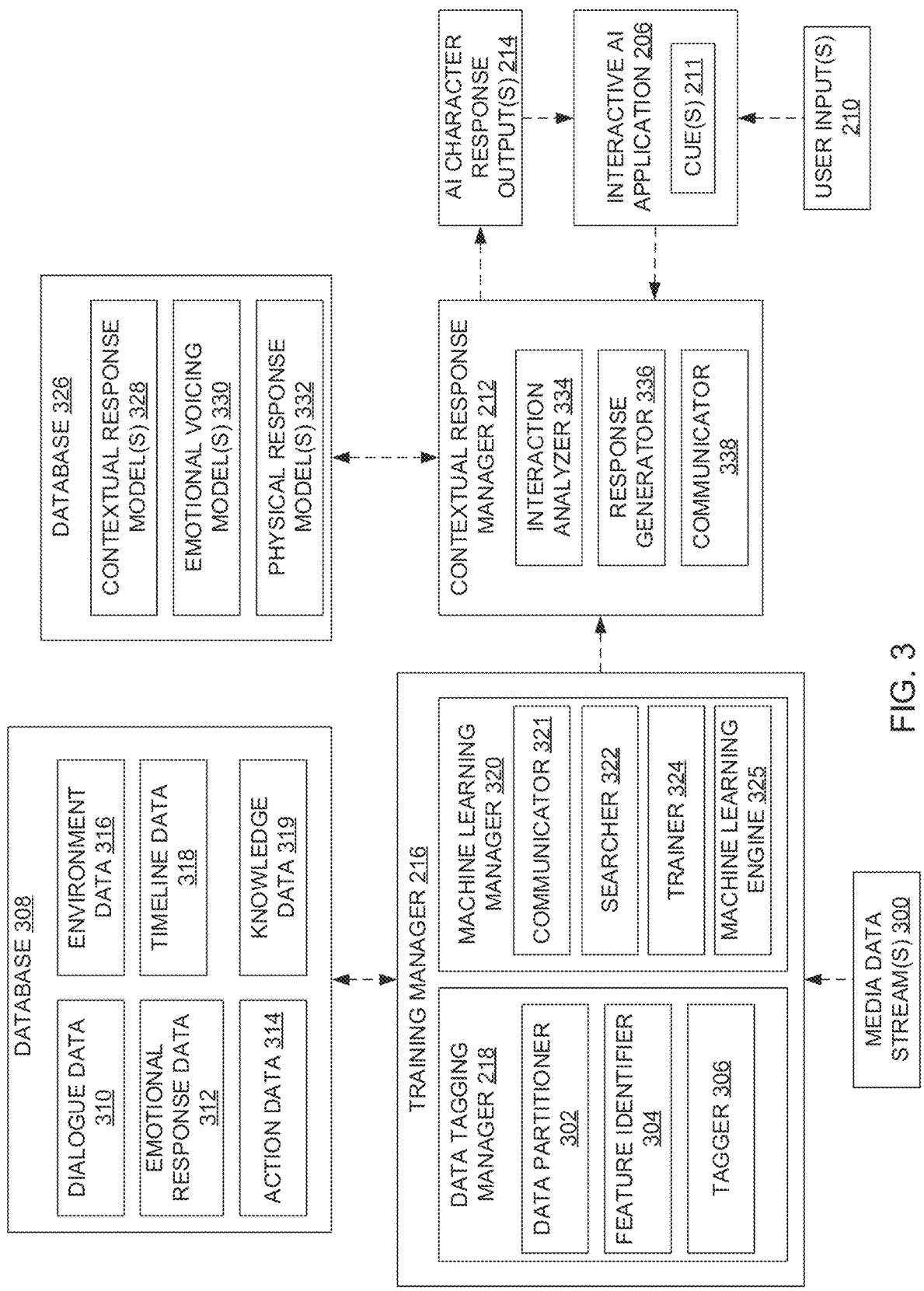
FIG. 3 is a block diagram of an example implementation of the training manager and the contextual response manager of FIG. 2.

FIG. 3 is a block diagram of an example implementation of the training manager 216 and the contextual response manager 212 of FIG. 2. The training manager 216 of this example receives one or more media data streams 300 including content (e.g., the storyline 100) to be analyzed with respect to one or more characters, one or more environment(s), one or more events, etc. The media data stream(s) 300 can include audio, video, and/or textual data from media sources such as books, radio broadcasts, movies, television episodes, newspaper and/or magazine interviews, video interviews, etc. The media data stream(s) 300 can include fictional content (e.g., fictional story with imaginary characters presented in a cartoon movie) and/or non-fictional content (e.g., a biography about Steve Jobs, a podcast recording of an interview with Paul McCartney). The media data stream(s) 300 can be received by the training manager 216 via one or more user inputs. The media data stream(s) 300 are stored in a database 308. In some examples, the training manager 216 includes the database 308. In other examples, the database 308 is located external to the training manager 216 in a location accessible to the training manager 216 as shown in FIG. 3.

The example data tagging manager 218 of the training manager 216 of FIG. 3 analyzes one or more portions of a media data stream 300 to create data file(s) that identify and tag the data (e.g., with XML tags) in the media data stream 300. The example data tagging manager 218 includes a data partitioner 302. In some examples, the data partitioner 302 divides the media data stream 300 into one or more segments for analysis. For example, the data partitioner 312 can divide the media data stream 300 into segments based on or more rules (e.g., user-defined) such as duration, detection or absence of a character of interest (e.g., the first character 112, the second character 114 of FIG. 1), data indicators marking transitions such as chapters, scene numbers (e.g., corresponding to the first, second, third, and/or fourth time periods 102, 104, 106, 108 of the storyline 100 of FIG. 1), and/or combinations of such rules and/or other rules. In some examples, the media data stream 300 is already partitioned and/or only includes one segment to be analyzed. In such examples, the data partitioner 302 may refrain from further partitioning the data stream 300 (e.g., by detecting that the data stream is a single chapter and/or not finding any other rationale for partitioning based on the rule(s)).

The example data tagging manager 218 of FIG. 3 includes a feature identifier 304. The feature identifier 304 identifies data to be tagged in the portion(s) of media data stream 300 (e.g., the partitioned media data stream) such as dialogue and/or actions associated with a character of interest (e.g., the first character 112). The feature identifier 304 employs one or more data recognition techniques, such as an automated speech detection to convert audio to text, animation modeling, motion capture from an actor, etc. In some examples, the feature identifier 304 uses a list of keywords and/or phrases to detect dialogue data that is indicative of the character's vocabulary, speech patterns, and/or emotion. In some examples, the feature identifier 304 recognizes metadata such as title, media type, etc. associated with the media data stream 300.

The example data tagging manager 218 includes a tagger 306. The tagger 306 generates one or more files (e.g., XML documents) that includes the data identified by the feature identifier 304 in each of the portion(s) of the media data stream 300 (e.g., for each time period 102, 104, 106, 108). In some examples, the data in the file(s) include the identical dialogue as spoken in the time period; in other examples, the data in the file(s) includes data indicative of content in the time period, such as the word "running" to indicate that the first character 112 ran during the time period. The tagger 306 labels each data item with a tag that provides context for the data, such as whether the data is dialogue data, scene information, action data, etc. For corresponding portion(s) of the media data stream 300, the tagger 306 generates data file(s) including hierarchal levels of tagged data with respect to, for instance, media information, timeline sequencing, character(s), emotion(s), dialogue, and/or character movement(s) in the respective portion(s) of the media data stream 300. For example, for a movie scene in a movie in which Merlin learns he is a wizard, the tagger 306 can generate an XML document including the example tagged data items shown in Table 1.

TABLE 1

Example Tagged Data for Movie Scene

| Data Level | Example Tagged Data |
| --- | --- |
| Media Level Information | <Story environment> Camelot</StoryEnvironment><br><StoryDetailLevel1>King Arthur's Court</StoryDetailLevel1> |
| Scene Level Information | <Property Value= "Merlin's Age" Name="PrimaryTimelineLabel"/><br><Property Value="12" Name="PrimaryTimeline"/><br><Property Value="Month" Name="SecondaryTimelineLabel"/><br><Property Value="7" Name="SecondaryTimelineLabel"<br><Property Value="3" Name="Scene"/> |
| Knowledge Scope Information Dialogue Information | <Property Value="Merlin, Arthur"<br>Name="CharacterSpecificKnowledge"/><br><Property Value= "" Name="RegionalSpecificKonwledgeLevel"/><br><PropertyValue="C:/HP/KingArthur'sCourt/Scene2/100023.wav"<br>Name="AudioSourceLocation"><br><PropertyValue="Merlin" Name="SourceCharacter"/><br><PropertyValue="Sorry about that" Name=Dialog"/><br><PropertyValue="normal" Name="EmotionalContext"/><br><PropertyValue="1" Name="DialogSequencing"/><br><PropertyValue="C:/HP/KingArthur'sCourt/Scene2/100024.wav"<br>Name="AudioSourceLocation"> |

TABLE 1-continued

Example Tagged Data for Movie Scene

| Data Level | Example Tagged Data |
| --- | --- |
| | <PropertyValue="Arthur" Name="SourceCharacter"/><br><PropertyValue="I demand that you leave at once sir. You are breaking and entering" Name=Dialog"/><br><PropertyValue="scared" Name="EmotionalContext"/><br><PropertyValue="2" Name="DialogSequencing"/> |
| Movement Information | <PropertyValue="C:/HP/KingArthur'sCourt/Scene2/100025.wav" Name="AudioSourceLocation"><br><PropertyValue="Merline" Name="SourceCharacter"/><br><PropertyValue="I will not leave" Name=Dialog"/><br><PropertyValue="angry" Name="EmotionalContext"/><br><PropertyValue="standing" Name="PrimaryAction"/><br><PropertyValue="3" Name="DialogSequencing"/> |

As shown in Table 1, the example tagger 306 of FIG. 3 tags a plurality of data related to the movie scene and stores the data in a data structure (e.g., a table, an array, etc.) in the database 308. Based on the tagging, the tagger 306 defines different categories of information about the movie scene including media level information, scene level information, knowledge scope information (e.g., which characters have direct knowledge of specified events), dialogue information for the respective character(s), and movement information for the respective character(s). Also, within each category, the tagger 306 defines values for different subsets of data, such as a primary timeline level (e.g., the character's age) and a secondary timeline level (e.g., the month). As shown in Table 1, within a category, the tagger 306 tags different types of information, such as the dialogue spoken by a character and the emotional context associated with the dialogue (e.g., based on keywords in the dialogue). The example tagger 306 may additionally or alternatively tag other data related to the movie scene than the example data shown in Table 1.

As also shown in Table 1, in some examples, the tagger 306 does not define a value for certain information that is not applicable to the corresponding portion. For example, in the knowledge scope information level indicating global character knowledge may be left null or unpopulated if the time period occurs early in the storyline but may be populated for data corresponding to later time periods. Based on the media information indicative of, for instance, the scene number, the tagger 306 may refrain from tagging certain data as associated with intuitional or fictional world level knowledge (e.g., Arthur is not yet aware of Merlin) so as not to improperly assign knowledge about character(s), event(s), and/or place(s) to a character before the character would learn about such character(s), event(s) and/or place(s).

The example tagger 306 of the example of FIG. 3 generates data file(s) (e.g., XML document(s)) including tagged data such as the example data in Table 1, for each of the time periods of the storyline in the media data stream 300. Thus, for a given time period (e.g., a scene, an audio clip, a chapter), the tagger 306 tags data within that given time period to generate a plurality of contextual information for that time period such as character behavior and events. As a result of tagging data identified by the feature identifier 304 in the different time period(s) of the media data stream 300, the tagger 306 compiles a collection of data that reflects a range of dialogue, movements, emotions, and knowledge associated with a particular character relative to a particular time (e.g., age, date, etc.) in the storyline. Referring to the storyline of FIG. 1, the data files created by the tagger 306 capture the vocabulary 120, 130 of the first and/or second characters 112, 114, the behavioral characteristics 122, 132 of the characters 112, 114, the knowledge 128, 138 of the characters 112, 114, the event(s) 119 occurring during the respective portion(s), the dialogue 118 exchanged, and/or the environment(s) 116 as of the point(s) in time of the in the corresponding portion(s) in the storyline. Thus, for each example, data may be stored as a file associated with a respective portion of the timeline (e.g., dialogue spoken by the first character 112 in the third time period 106). As such, the file itself may have a global tag mapping the file to a specific portion of the storyline. Alternatively, the data may be stored in data groups (e.g., all dialogue spoken by all characters in the third time period) and the data groups may be stored in one file and this one file and each data group may be tagged with a global tag mapping it to a portion.

In the example of FIG. 1, the data identified by the feature identifier 304 and labeled by the tagger 306 in the XML documents generated by the tagger 306 is stored in the database 308. In the illustrated example, the database 308 provides means for storing the data identified from the media data stream 300. The data can be indexed in the database 308 based on variables such as character, timeline, environment, etc.

Using the storyline 100 of FIG. 1 including the first character 112 as an example media data stream 300 for illustrative purposes, the database 308 stores dialogue data 310, or data identified in a particular time period (e.g., any of the first, second, third, and/or fourth time periods 102, 104, 106, 108) by the feature identifier 304 and labeled by the tagger 306 in the data file for that time period as dialogue data (e.g., the dialogue information in Table 1). The dialogue data 310 includes the words and/or phrases spoken by the first character 112 in the time period(s) of the storyline 100.

The database 308 stores emotional response data 312, or data identified in a particular time period by the feature identifier 304 and tagged by the tagger 306 in the data file for that time period as emotion data. The emotional response data 312 includes the different emotions expressed by the first character 112 (e.g., scared). The emotional response data 312 can include speech pattern(s) exhibited by the first character 112.

The database 308 stores action data 314 identified in a particular time period by the feature identifier 304 and tagged by the tagger 306 in the data file for that time period as action data. The action data 314 includes actions performed by the first character 112 (e.g., standing). The action data 314 can include emotion-based facial expressions (e.g., smiling) and body language (e.g., crossed arms).

The example database 308 of FIG. 3 stores environment data 316 identified in a particular time period by the feature identifier 304 and labeled by the tagger 306 in the data file for that time period as environment data. The environment data 316 includes data indicative of the different environments in which the first character 112 is located. In some examples, the environment data 316 includes vocabulary or terminology associated with the environment (e.g., a castle for a Camelot environment) that would be familiar to the first character 112.

The example database 308 includes timeline data 318 identified in a particular time period by the feature identifier 304 and labeled by the tagger 306 in the data file for that time period as timeline information. The timeline data 318 includes data indicative of the scene information in which events and/or dialogue occur.

In some examples, the database 308 stores knowledge data 319 identified in a particular time period by the feature identifier 304 and labeled by the tagger 306 in the data file for that time period as knowledge data. The knowledge data 319 identifies character specific knowledge about certain events occurring during, for instance, the storyline 100 of FIG. 1. The knowledge data 319 can be indexed with the timeline data 318 to define the scope of the character's knowledge at different times (e.g., over the course of the portions of the media data stream 300, over the course of two or more different media data streams, such as two television episodes, etc.).

The example database 308 can store other types of data identified by the feature identifier 304 and labeled in the XML document(s) by the tagger 306, such as physical characteristic data for the first character 112 corresponding to the appearance(s) of the first character 112 in the different portion(s) of the media data stream(s) 300.

Thus, the example data tagging manager 218 identifies data in the respective portion(s) of the media data stream(s) 300 and generates file(s) including the data and corresponding labels assigned to the data that identifies the data as associated with, for example, dialogue, actions, etc. As discussed above, in some examples, the data tagging manager 218 identifies data to include and label in the data file(s) (e.g., XML document(s)) from a plurality of existing media sources presenting storylines involving the first character 112, such as a full-length movie, a season of television episodes, and/or a book. In other examples, the AI character 208 may portray a newly created character that is not found in existing storylines (e.g., a new personal digital assistant). In some other examples, the AI character 208 may portray a secondary character that is less established in existing storylines (e.g., a knight in King Arthur's court). In examples in which the AI character 208 portrays a new character or a secondary character, specific content or data regarding the characteristics of the new or secondary character can be provided to the data tagging manager 218 to generate a sufficient amount of data for training the contextual response manager 212. Such data can include user inputs specifying, for example, certain events involving the new character or the secondary character.

The example training manager 216 of FIG. 3 uses the tagged data 310, 312, 314, 316, 318 stored in the database 308 to train the contextual response manager 212 to provide character-specific, contextually appropriate responses via the AI character 208 in response to the users input(s) 210 and/or cue(s) 211. The example training manager 216 of FIG. 2 includes a machine learning manager 320. The machine learning manager 320 controls training of the contextual response manager 212 with respect to the character(s) portrayed by the AI character(s) 208 and the character response output(s) 214 to be generated by the contextual response manager 212 relative to particular points of time in the storyline. The example machine learning manager 216 includes a communicator 321 to communicate with the contextual response manager 212 via one or more wired or wireless communication protocols.

The example machine learning manager 320 includes a searcher 322. The searcher 322 searches the data (e.g., the XML file data) stored in the database 308 for the data related to a particular character to be portrayed by the AI character 208 of FIG. 2. The searcher 322 identifies the time periods of interest corresponding to the portrayal of the character at particular points of time in a storyline. The data identified by the searcher 322 as a result of the search is used as training datasets in a machine learning process executed by the machine learning manager 320. The searcher 322 defines search parameters for the search based on, for example, one or more user inputs defining characteristics of the character to be portrayed by the AI character 208. For example, if the AI character 208 is to portray King Arthur when he was age eight, the searcher 322 identifies data in the database 308 from data file(s) associated with time period(s) when King Arthur was age eight or under. Within those data file(s), the searcher 322 can search for data associated with King Arthur's vocabulary when he was age eight. As another example, the searcher 322 can search data in the database 308 for all time periods to identify a range of actions performed by King Arthur when he expresses the emotion of excitement. The searcher 322 searches the database 308 to identify data identified from the media data stream(s) 300 and stored in the database 308 (e.g., via the file(s) or XML document(s) generated by the tagger 306) that satisfies the search parameter(s).

The results identified from the search of the database 308 include dataset(s) of the relevant data (e.g., action data, dialogue data) for particular time period(s) of the storyline. For example, a search for King Arthur's vocabulary when he was age eight returns dataset(s) including dialogue data from each time period in which King Arthur was age eight or under (e.g., based in data stored in the database 308 with labels for King Arthur's age).

The machine learning manager 320 of the example of FIG. 3 includes a trainer 324 and a machine learning engine 325. The trainer 324 trains the machine learning engine 325 using the dataset(s) identified by the searcher 322 (e.g., supervised learning) to generate one or more models that are used by the contextual response manager 212 to determine the outputs to be provided by the AI character 208 portraying a character such as the first character 112. For example, the trainer 324 uses the dataset(s) including dialogue data 310 and the timeline data 318 to generate a model via the machine learning engine 325 that defines what the AI character 208 should say that corresponds to character-specific vocabulary, grammatical phrasing, slang, etc. at a certain age of the character being portrayed. As another example, the trainer 324 uses the emotional response data 312 to create a model via the machine learning engine 325 that defines how the AI character should say certain content that corresponds to the speech patterns and emotion-based voicings by the character being portrayed.

For example, the searcher 322 identifies training dataset(s) from the database 308 including the emotional response data 312 associated with the first character 112 of FIG. 1 for all time periods analyzed in the media. As a result of training the machine learning engine 325, the machine learning generator 325 generates model(s) that are used by the contextual response manager 212 to recognize that the first character 112 only stutters when scared or nervous but does not stutter for other emotions. Additional training based on training datasets including the emotional response data 312 can result in model(s) that are used by the context response manager 212 to recognize that a frequency of stuttering when the first character 112 is scared is higher than when the first character 112 is nervous based on the emotional response data 312 and the training by the trainer 324.

As another example, the searcher 322 identifies training dataset(s) from the database 308 including action data 314 associated with the first character 112 when the character was under one year old. In such examples, the dataset(s) include data from one or more time periods in which the first character 112 was one year old or under, but not data from time periods when the first character 112 was over one year old so as not to train the contextual response manager 212 to output behaviors that the first character 112 did not or could not perform at age one (e.g., skipping). The trainer 324 uses the training dataset(s) to generate learned model(s) via the machine learning engine 325 that are used by the context response manager 212 to recognize that the first character 112 claps when excited at age one.

As another example, the trainer 324 uses the knowledge data 319 and the timeline data 318 to generate model(s) via the machine learning engine 325 that are used by the contextual response manager 212 to recognize the event(s) that the character knows at certain points in time relative to the storyline. The training dataset(s) used by the trainer 324 with respect to character knowledge can include data from time periods of the storyline corresponding to a current time period of the storyline and earlier time periods. In some examples, the earlier time periods and/or events associated with the earlier time periods may not have been presented to the user via the AI application 206, as in the case of flashbacks (e.g., where the first time period 102 of FIG. 1 corresponds to present day and the third time period 104 corresponds to a flashback). Nonetheless, in such examples, the earlier time periods are used in the training to accurately represent the scope of the character's knowledge.

The trainer 324 can use one or more datasets in the database 308 having different degrees of specificity to generate the machine learning model(s) to train the contextual response manager 212, such as a dataset associated with King Arthur at age eight and a dataset associated with King Arthur at age eight on July 31$^{st}$. Thus, the contextual response manager 212 learns a range of emotions, vocabulary, actions, etc. associated with the character to be portrayed by the AI character 208. As a result, the contextual response manager 212 can dynamically generate context-appropriate responses in response to the user input(s) 210 and/or AI application cue(s) 211 based on the machine learning model(s). Because the contextual response manager 212 learns the range of character vocabulary, actions, and emotional responses, in some examples, the outputs generated by the contextual response manager 212 are ad hoc or varied. For example, contextual response manager 212 can instruct the AI character 208 to output a first action indicating excitement in response to a first user input (e.g., jumping) and a second action indicating excitement in response to a second user input (e.g., hand clapping). The user inputs may be obtained via a camera (e.g., the Xbox® Kinect®) or any other input device to enable the AI character to align its behavior with the behavior or action of the user, both informed by the storyline as represented in the datasets.

The machine learning model(s) generated during training by the trainer 324 are stored in a database 326. In some examples, the contextual response manager 212 includes the database 326. In other examples, the database 326 is located external to the contextual response manager 212 in a location accessible to the contextual response manager 212. The databases 308, 326 of FIG. 3 may be the same storage device or different storage devices.

As explained above, in the example of FIG. 3, the contextual response manager 212 uses the machine learning model(s) to determine the AI character response output(s) 214 in response to the user input(s) 210 and/or the AI application cue(s) 211. For example, the model(s) can include one or more contextual response model(s) 328 that are used by the contextual response manager 212 to determine content that the AI character 208 should know during a user interaction or AI application-initiated interaction at a specific point in time of a storyline. The model(s) can include one or more emotion voicing model(s) 330 that are used by the contextual response manager 212 to determine how the AI character 208 should say the content. For example, the emotion voicing model(s) 330 can include a first model generated based on training data indicative of the range of character speech patterns when happy to determine how the AI character should express happiness and a second model generated based on training data indicative of the range of character speech patterns when sad to determine how the AI character 208 should express sadness. The model(s) can include one or more physical response model(s) 332 that are used by the contextual response manager 212 to determine what actions the AI character 208 should perform, such as facial expressions, movements, body language etc. The physical response model(s) 332 can be based on training data that includes data indicative of the physical capabilities of the character at different ages represented in the respective time periods.

The example database 326 can store additional or fewer models than shown in FIG. 3. For example, if the interactive AI application 206 of FIG. 2 does not accommodate visual data (e.g., an audiobook, a personal digital assistant device), the contextual response manager 212 may not be trained with respect to physical responses that visually portray the character's response to the user input(s) 210 and/or application cue(s) 211. In such examples, the physical response model(s) 332 may not be generated or provided to the contextual response manager 212.

The example contextual response manager 212 of FIG. 3 includes an interaction analyzer 334. The interaction analyzer 334 analyzes the user input(s) 210 and/or the cue(s) 211 received by contextual response manager 212 to determine, for example, the character to which the interaction was directed (e.g., the AI character portraying the first character 112 or the AI character portraying the second character 114), the output parameter(s) of the interaction (e.g., is an audio response expected from the AI character, is an action expected from the AI character), and the time- and/or situational context of the interaction (e.g., a scene in an audiobook during which the interaction was initiated, a decade in which a historical event took place, or other time period in a storyline).

The contextual response manager 212 of the example of FIG. 3 includes a response generator 336. The response generator 336 uses the analysis of the user input(s) 210 and/or the AI application cue(s) 211, and the model(s) 328, 330, 332 to generate the AI character response output(s) 214. For example, based on a context of a user's question (e.g., a user input 210), the time- and/or situational context of the interaction (e.g., a chapter of a story in which the input was received, the scene, the year), and the contextual response model(s) 328, the response generator 336 determines the response phrase(s) that should be output as an audio response by the AI character 208. In some examples, the contextual response model(s) 328 account for character-specific knowledge in determining what the AI character 208 should say (e.g., to avoid anachronism such as having a George Washington AI character talk about the Internet). The response generator 336 uses the emotional voicing model(s) 330 to determine the emotion context in which the response phrase(s) should be output (e.g., in a voice expressing sadness). In some examples, the response generator 336 uses the physical response model(s) 332 to determine a visual response (e.g., an action, a facial expression) to accompany the response phrase(s). The response generator 336 implements the model(s) 328, 330, 332 generated based on the training by the trainer 324 to identify the contextually appropriate response output(s) 214 by the AI character(s) 208.

The contextual response manager 212 of the example of FIG. 3 includes a communicator 338 to transmit the AI character response output(s) 214 to the interactive AI application 206. In some examples, the communicator 338 interfaces and/or communicates with graphic engines, audio output generators, etc. associated with the AI application 206 and/or the user device 202 to provide character movement, generate sound outputs, synchronization audio outputs with character movements, etc.

While an example manner of implementing the example training manager 216 of FIG. 2 is illustrated in FIG. 3, one or more of the elements, processes and/or devices illustrated in FIG. 3 may be combined, divided, re-arranged, omitted, eliminated and/or implemented in any other way. Further, the example data tagging manager 218, the example data partitioner 302, the example feature identifier 304, the example tagger 306, the example database 308, the example machine learning manager 320, the example communicator 321, the example searcher 322, the example trainer 324, the machine learning engine 325, and/or, more generally, the example training manager of FIG. 3 may be implemented by hardware, software, firmware and/or any combination of hardware, software and/or firmware. Thus, for example, any of the example data tagging manager 218, the example data partitioner 302, the example feature identifier 304, the example tagger 306, the example database 308, the example machine learning manager 320, the example communicator 321, the example searcher 322, the example trainer 324, the machine learning engine 325, and/or, more generally, the example training manager of FIG. 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data tagging manager 218, the example data partitioner 302, the example feature identifier 304, the example tagger 306, the example database 308, the example machine learning manager 320, the example communicator 321, the example searcher 322, the example trainer 324, and/or the machine learning engine 325 is/are hereby expressly defined to include a non-transitory computer readable storage device or storage disk such as a memory, a digital versatile disk (DVD), a compact disk (CD), a Blu-ray disk, etc. including the software and/or firmware. Further still, the example training manager 216 of FIGS. 2 and 3 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

While an example manner of implementing the example contextual response manager 212 of FIG. 2 is illustrated in FIG. 3, one or more of the elements, processes and/or devices illustrated in FIG. 3 may be combined, divided, re-arranged, omitted, eliminated and/or implemented in any other way. Further, the example interaction analyzer 324, the example database 326, the example response generator 336, the example communicator 338 and/or, more generally, the example training manager of FIG. 3 may be implemented by hardware, software, firmware and/or any combination of hardware, software and/or firmware. Thus, for example, any of the example interaction analyzer 324, the example database 326, the example response generator 336, the example communicator 338 and/or, more generally, the example training manager of FIG. 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example interaction analyzer 324, the example database 326, the example response generator 336, and/or the example communicator 338 is/are hereby expressly defined to include a non-transitory computer readable storage device or storage disk such as a memory, a digital versatile disk (DVD), a compact disk (CD), a Blu-ray disk, etc. including the software and/or firmware. Further still, the example contextual response manager 212 of FIGS. 2 and 3 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
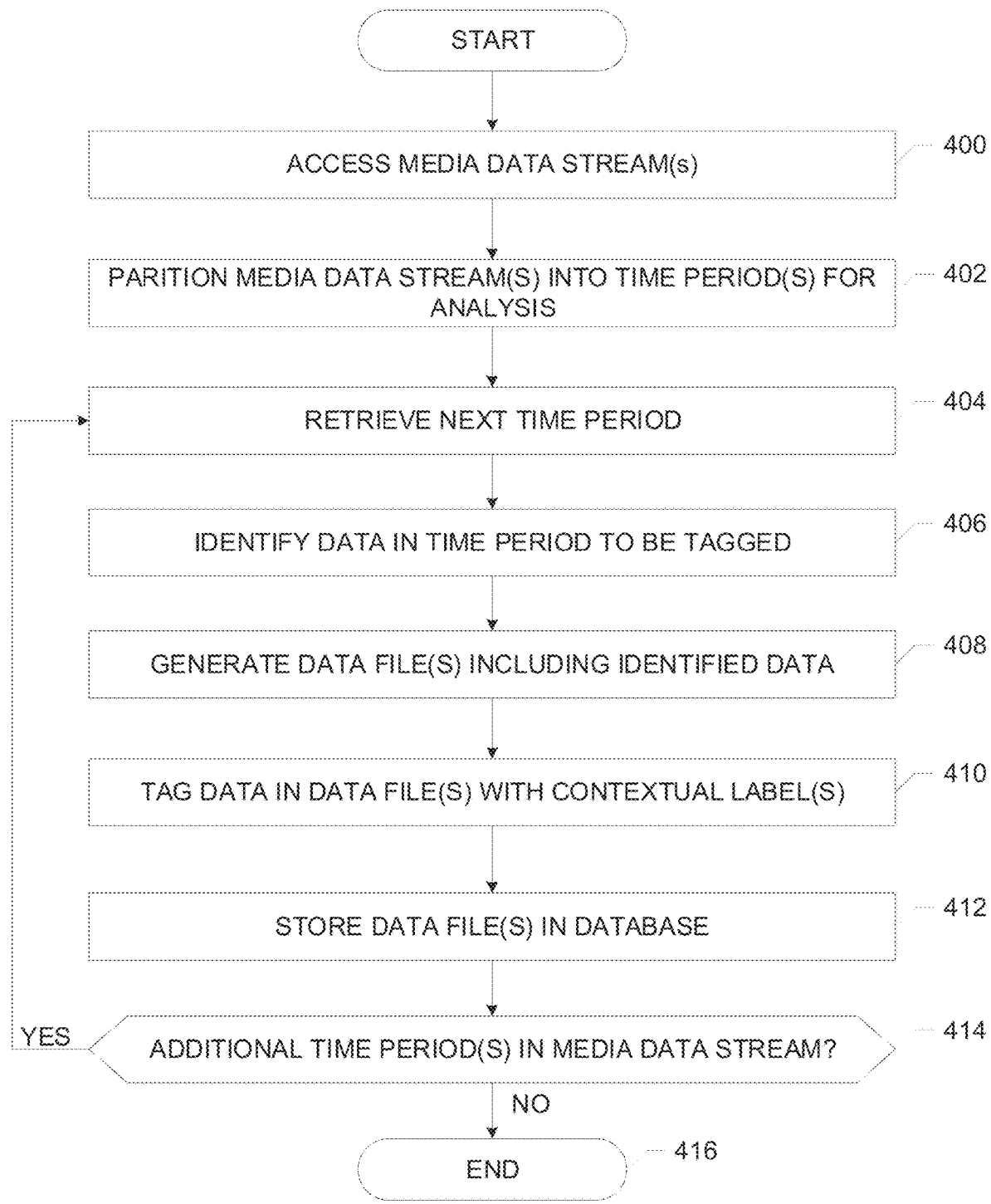
FIG. 4 is a flowchart representative of example machine readable instructions which may be executed to implement the example training manager of FIGS. 2 and/or 3.
Figure 5:
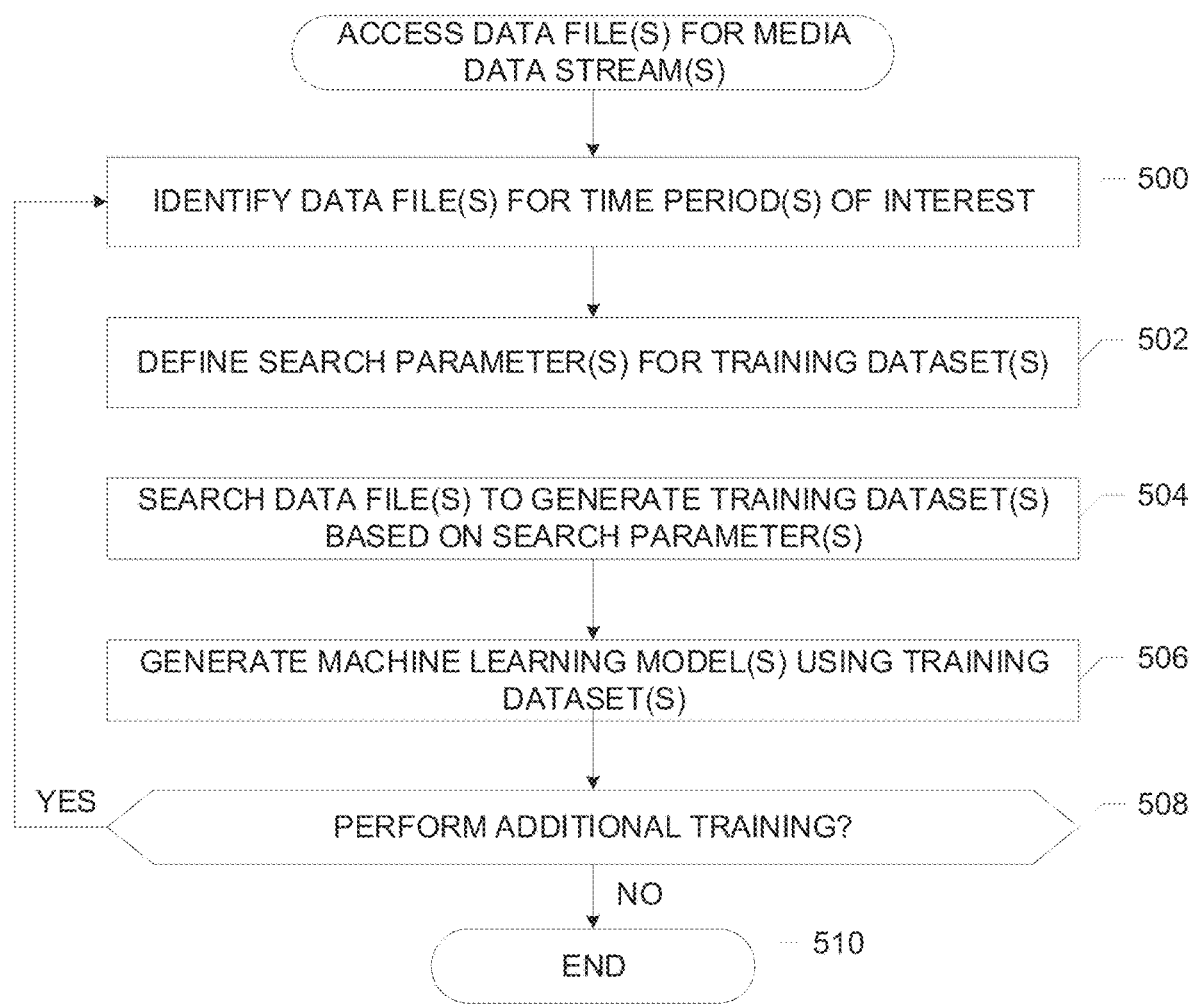
FIG. 5 is another flowchart representative of example machine readable instructions which may be executed to implement the example training manager of FIGS. 2 and/or 3.
Figure 6:
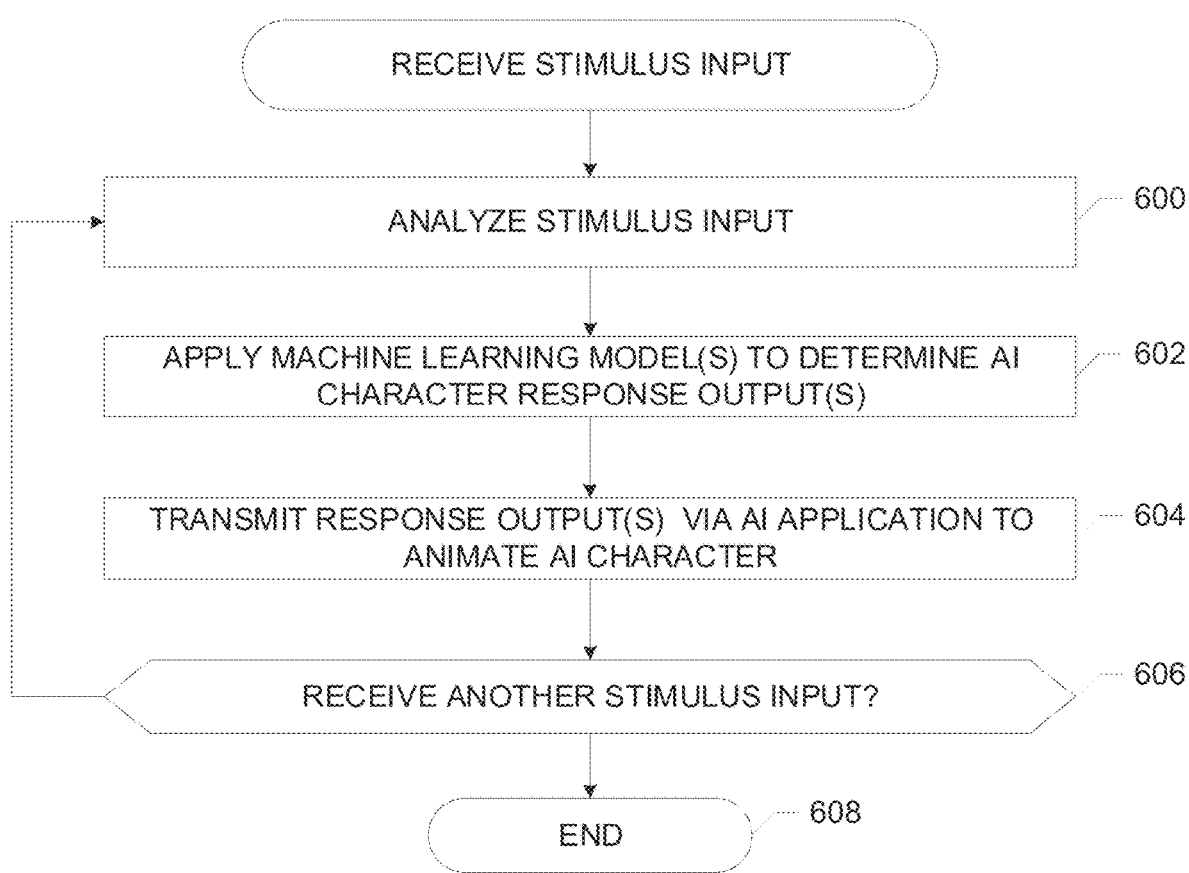
FIG. 6 is a flowchart representative of example machine readable instructions which may be executed to implement the example contextual response manager of FIGS. 2 and/or 3.

Flowcharts representative of example hardware logic, machine readable instructions, hardware implemented state machines, and/or any combination thereof for implementing the example training manager 216 and/or the example contextual response manager 212 are shown in FIGS. 4-6. The machine readable instructions may be an executable program or portion of an executable program for execution by a computer processor such as the processor(s) 212, 216 shown in the example processor platform(s) 700, 800 discussed below in connection with FIGS. 7 and 8. The program may be embodied in software stored on a non-transitory computer readable storage medium such as a CD-ROM, a floppy disk, a hard drive, a DVD, a Blu-ray disk, or a memory associated with the processor(s) 212, 216, but the entire program and/or parts thereof could alternatively be executed by a device other than the processor(s) 212, 216 and/or embodied in firmware or dedicated hardware. Further, although the example program is described with reference to the flowcharts illustrated in FIGS. 4-6, many other methods of implementing the example training manager 216 and/or the example contextual response manager 212 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 4-6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

FIG. 4 is a flowchart of example machine readable instructions that, when executed, implement the example training manager 216 of FIGS. 2 and/or 3. As explained above, the training manager 216 tags data in one or more portions of a media data stream (e.g., the media data stream 300). As discussed herein, the resulting tagged data can be used to train the example contextual response manager 212 of FIGS. 2 and/or 3 to generate response outputs for an AI character as part of an AI application user interaction.

The example instructions of FIG. 4 by one or more processors of, for instance, a user device (e.g., the user device 202) and/or a cloud-based device. The instructions of FIG. 4 can be executed in substantially real-time as the media data stream(s) are received by the training manager 216 or at some time after the media data stream(s) are received by the training manager 216.

The example data partitioner 302 of FIG. 3 accesses media data stream(s) 300 associated with media sources such as videos, books, and audio provided via one or more user input(s) (block 400). The media data stream(s) 300 can be stored in the database 308. The example data partitioner 302 of FIG. 3 partitions the respective media data streams into two or more time periods for analysis (block 402). The media data stream(s) 300 can be partitioned by the data partitioner 302 by video frame, chapter, media duration, etc.

The example feature identifier 304 of FIG. 3 retrieves a time period for analysis (block 404). The example feature identifier 304 identifies data in the time period to be tagged with respect to one or more contextual labels, such as dialogue data, scene information, action data (block 406). For instance, the example feature identifier 304 can identify data corresponding to dialogue of one or more characters. The example feature identifier 304 can use data recognition techniques such as speech detection to identify the dialogue. In some examples, the feature identifier 304 uses a list of keyword list of words or phrases to detect dialogue data that is indicative of the character's vocabulary, speech patterns, and/or emotion.

The example tagger 306 of FIG. 3 generates one or more data file(s) (e.g., XML documents) for the time period including the data identified by the feature identifier (e.g., identical data such as the phrase spoken or data indicative of an action that was performed during the time period, such as the word "running" to indicate that the character ran during the time period) (block 408). The example tagger 306 tags the data identified by the feature identifier 304 and included in the data file(s) with one or more contextual label(s) (block 410). The example tagger 306 tags the data using, for example, XML tagging, to generate data file(s) including hierarchical levels of tagged data such as, for instance, scene information (e.g., character age, scene month, scene day), dialogue information (e.g., speaker, phrases or words spoken, associated emotions), and movement information (e.g., actor, action, associated dialogue). The tagged data can include dialogue data (e.g., the dialogue data 310), emotional response data (e.g., the emotional response data 312), action data (e.g., the action data 314), environment data (e.g., the environment data 316), timeline data (e.g., the timeline data 318), and/or knowledge data (e.g., the knowledge data 319).

The tagger 306 stores the data file(s) with the tagged data in the example database 308 (block 412). The example data tagging manager 218 continues to analyze the media data stream(s) to identify data in the media data stream(s) for inclusion and tagging in one or more data file(s) (block 414). If there are no further media data stream(s) to be analyzed, the instruction of FIG. 4 end (block 416).

FIG. 5 is a flowchart of example machine readable instructions that, when executed, implement the example training manager 216 of FIGS. 2 and/or 3. In the example of FIG. 4, the training manager 216 trains the example contextual response manager 212 of FIGS. 2 and/or 3 using tagged data (e.g., the data 310, 312, 314, 316, 318, 319) from media data stream(s) to generate response outputs for an AI character (e.g., the AI character 208) as part of an AI application user interaction. More specifically, the example instructions of FIG. 5 can implement the machine learning manager 320 of the training manager 216 of FIGS. 2 and/or 3. The instructions can be executed by one or more processors of, for instance, a user device (e.g., the user device 202) and/or a cloud-based device. The machine learning manager 320 can communicate with the contextual response manager 212 via the communicator 321 and one or more wired or wireless communication protocols.

The example searcher 322 identifies data file(s) stored in the database 308 for the time period(s) of interest with respect to, for example, character vocabulary, knowledge, emotions, etc. at one or more particular points in a storyline (block 500). The example searcher 322 defines search parameters to identify dataset(s) that are to be used to train the contextual response manager (block 502). The searcher 322 defines the search parameters based on, for example, one or more user inputs defining characteristics of the character to be portrayed by the AI character (e.g., the first character 112 of the storyline 100 of FIG. 1). For example, the searcher 322 can define parameters that identify data indicative of phrases spoken by the character when the character is excited. The example searcher 322 searches the data file(s) to identify the tagged data in the database 308 that satisfies the search parameter(s) as training data (block 504).

The example trainer 324 of FIG. 3 generates one more machine learning model(s) 328, 330, 332 via the machine learning engine 325 and based on the training data defining the behavior, vocabulary, knowledge, etc. of a character to be portrayed by the AI character (block 506). For example, the trainer 324 uses dialogue data and action data to generate the contextual response model(s) 328 that are used by the contextual response manager 212 to determine what the phrases the AI character should say in the portrayal of the character (e.g., the first character 112). The trainer 324 uses emotional response data to generate the emotional voicing model(s) 330 that are used by the contextual response manager 212 to determine how the AI character should say certain content that corresponds to the speech patterns and emotion-based voicings by the character being portrayed.

The example trainer 324 can continue train the contextual response manager 212 uses different datasets and/or datasets having different levels of specificity (block 508). For example, the trainer 324 can generate machine learning model(s) for use by the contextual response manager 212 using a first training dataset including phrases spoken by the character when the character is excited, a second training dataset including phrases spoken by the character when the character is excited and is in a particular environment, and a third training dataset including phrases spoken by the character when the character is excited and is under a certain age. Thus, the trainer 324 provides the contextual response manager 212 with machine learning model(s) that the contextual response manager 212 can use to recognize a range of phrases, emotions, actions, etc. associated with the character to be portrayed by the AI character. The example instructions end when there is not additional training to be performed (e.g., based on user input(s)) (block 510).

FIG. 6 is a flowchart of example machine readable instructions that, when executed by a processor, implement the example contextual response manager 212 of FIGS. 2 and/or 3. In the example of FIG. 6, the contextual response manager 212 generates response output(s) for an AI character that is portraying a character (e.g., a fictional character, as historical character) or personality (e.g., a virtual assistant) in response to user input(s) or cue(s) associated with an AI application user interaction (e.g., the interactive AI application 206).

The example instructions of FIG. 6 can be executed by one or more processors of, for instance, a user device (e.g., the user device 202) and/or a cloud-based device. The instructions of FIG. 6 can be executed in substantially real-time as a user interacts with the AI application.

The interaction analyzer 334 analyzes a stimulus input (e.g., the user input 210, the cue 211) that is received by the contextual response manager 212 (block 600). For example, the interaction analyzer 334 analyzes the user input or cue to determine what character that should provide the response (e.g., the AI character portraying the first character 112 or the AI character portraying the second character 114), the output parameters of the interaction (e.g., whether the output should be in an audio and/or visual format), and the time- and/or situational context of the interaction (e.g., the current scene and/or environment in the AI application, the emotional context of the input or cue based on keyword detection, etc.).

The response generator 336 applies learned model(s) (e.g., the contextual response model(s) 328, the emotional voicing model(s) 330, the physical response model(s) 332) to determine one or more AI character response outputs 214 (block 602). The learned model(s) 328, 330, 332 are generated during the training of the contextual response manager 212 by the training manager 216 (e.g., via the machine learning engine 325). Based on the learned model(s), the response generator 336 determines character-specific and contextually appropriate response(s) to be output via the AI character. The response output(s) generated by the response generator 336 can include content that the AI character should say, how the AI character should say the content (e.g., with a particular speech pattern), and/or action(s) the AI character should perform in the portrayal of a character or personality (e.g., the first character 112) at particular points in a storyline. In some examples, the response output(s) generated by the response generator 336 vary or are ad hoc relative to different use input(s) and/or cue(s) to enable the AI character to, for instance, output a range of responses to express an emotion such as happiness.

The example communicator 338 of FIG. 3 transmits the character response output(s) to the AI application 206 to animate the AI character (block 604). The example communicator 338 can communicate or interface with audio generators and/or graphic engines of a user device (e.g., the user device 202) to produce the AI character response output(s).

The example contextual response manager 212 continues to generate AI character response output(s) in response to stimulus input(s) (block 606). The instructions of FIG. 6 end when no further stimulus input(s) are received by the contextual response manager 212.

Figure 7:
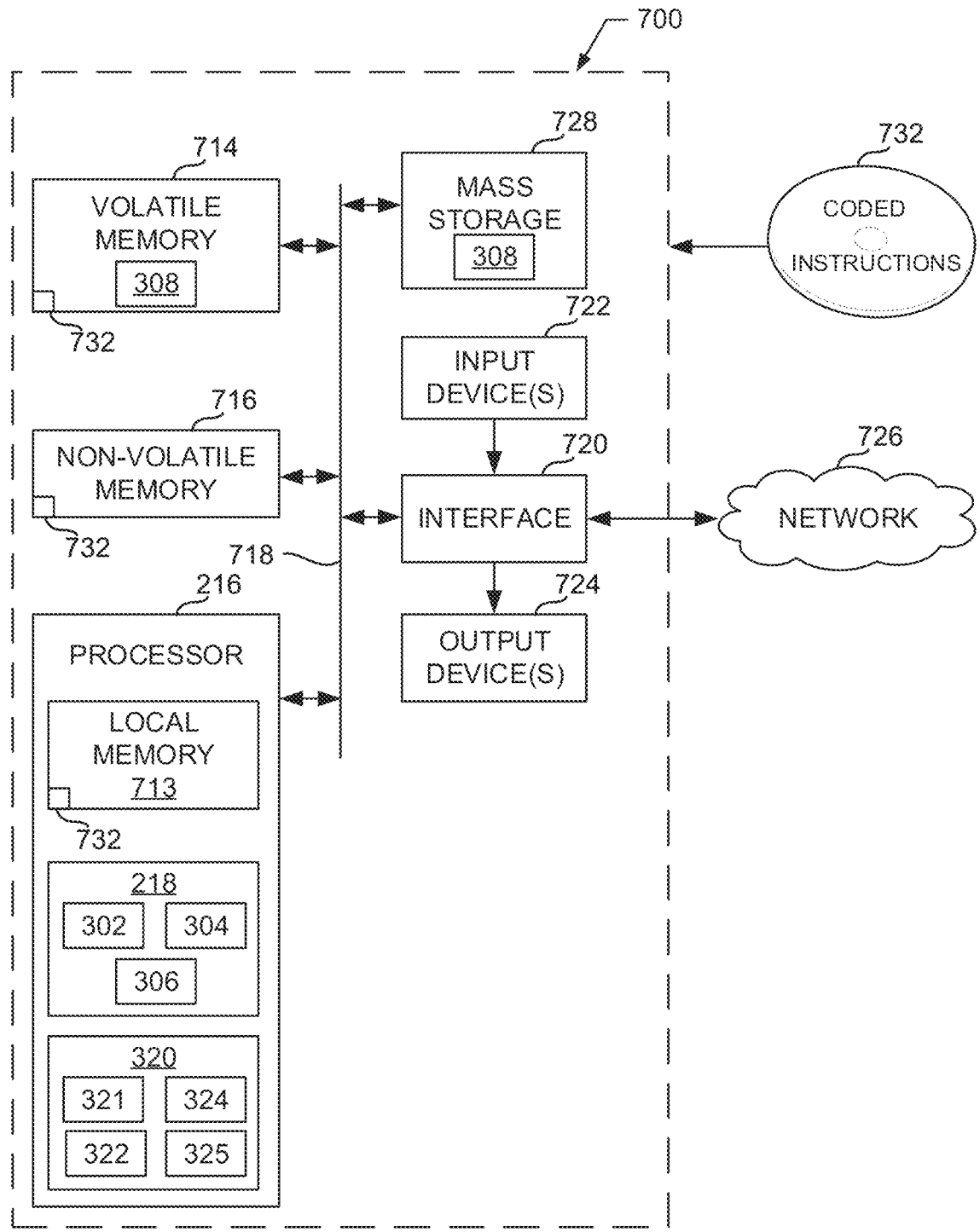
FIG. 7 is a block diagram of an example processing platform structured to execute the instructions of FIGS. 4 and/or 5 to implement the example training manager of FIGS. 2 and/or 3.

FIG. 7 is a block diagram of an example processor platform 700 structured to execute the instructions of FIGS. 4 and/or 5 to implement the example training manager 216 of FIGS. 2 and/or 3. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 700 of the illustrated example includes a processor 216. The processor 216 of the illustrated example is hardware. For example, the processor 216 can be implemented by one or more integrated circuits, logic circuits, microprocessors, GPUs, DSPs, or controllers from any desired family or manufacturer. The hardware processor may be a semiconductor based (e.g., silicon based) device. In this example, the processor executes the instructions represented by FIGS. 4 and/or 5 to implement the example data tagging manager 218, the example data partitioner 302, the example feature identifier 304, the example tagger 306, the example machine learning manager 320, the example communicator 321, the example searcher 322, the example trainer 324, and the example machine learning engine 325.

The processor 216 of the illustrated example includes a local memory 713 (e.g., a cache). The processor 216 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 822 permit(s) a user to enter data and/or commands into the processor 216. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIGS. 4 and/or 5 may be stored in the mass storage device 728, in the volatile memory 714, in the non-volatile memory 716, and/or on a removable non-transitory computer readable storage medium such as a CD or DVD.

Figure 8:
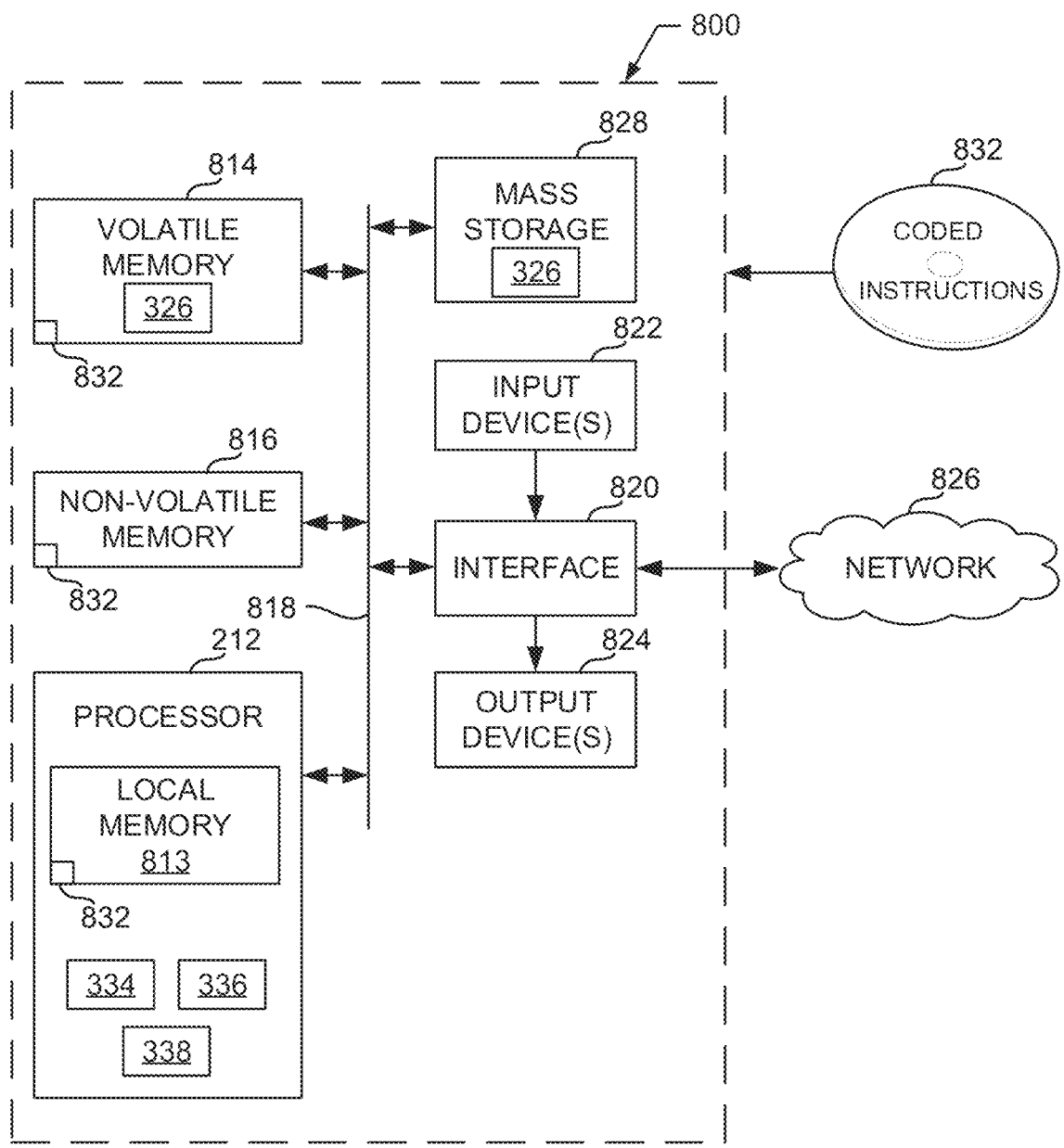
FIG. 8 is a block diagram of an example processing platform structured to execute the instructions of FIG. 6 to implement the example contextual response manager of FIGS. 2 and/or 3.

FIG. 8 is a block diagram of an example processor platform 800 structured to execute the instructions of FIG. 6 to implement the example contextual response manager 212 of FIGS. 2 and/or 3. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 800 of the illustrated example includes a processor 212. The processor 212 of the illustrated example is hardware. For example, the processor 212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor executes the instructions of FIG. 6 to implement the example interaction analyzer 334, the example response generator 336, and the example communicator 338.

The processor 212 of the illustrated example includes a local memory 813 (e.g., a cache). The processor 212 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIG. 6 may be stored in the mass storage device 828, in the volatile memory 814, in the non-volatile memory 816, and/or on a removable non-transitory computer readable storage medium such as a CD or DVD.

From the foregoing, it will be appreciated that example methods, apparatus and articles of manufacture have been disclosed that generate response outputs by an AI character in an AI application that account for a range of behaviors exhibited by a character (e.g., a fictional character, a celebrity, a virtual assistant personality) being portrayed by the AI character to provide for a contextually sensitive user AI experience. Examples disclosed herein train a contextual response manager to recognize a variety of character-specific behaviors in different situations, time sequences, etc. to enable the contextual response manager to generate dynamic responses to be output by the AI character in response to a user input. Some disclosed examples animate an AI character to be consistent with a storyline including the character portrayed by the AI character with respect to behavior, knowledge, emotion, vocabulary, etc. at particular times in the storyline to align with user expectations for the interactive AI experience.

Disclosed methods, apparatus and articles of manufacture improve the efficiency of using a computing device by identifying relevant data in a media data stream including the character portrayed by the AI character, such as dialogue data and speech pattern data (e.g., using speech detection techniques) and tagging the data with contextually instructive labels. Disclosed examples use the tagged data and machine learning techniques to teach the contextual response manager to generate different AI character response outputs in different contexts. Unlike known examples in which the AI character outputs are limited with respect to speech pattern, movements, language, etc., disclosed examples provide for varied or ad hoc AI character outputs in different contexts that represent a range of character behaviors, emotions, and/or knowledge with respect to specific point(s) in time of a storyline and, thus, provide for more realistic and/or less anachronistic AI user interactions. Disclosed examples generate models that serve as rules for animating an AI character to more realistically portray a character consistent character development throughout a storyline rather than providing an AI character with generic or global knowledge that may not be appropriate in view of the storyline, time frame, etc. The example model(s) generated herein can further serve as rules to enable an AI character to more accurately express emotions associated with input or output content as compared to use of monotone voice that fails to distinguish between funny and serious subject matter and, thus, fails to reflect human interactions. The disclosed methods, apparatus and articles of manufacture are accordingly directed to one or more improvement(s) in the functioning of a computer.

The following is a non-exhaustive list of examples disclosed herein. Other examples may be included above. In addition, any of the examples disclosed herein can be considered whole or in part, and/or modified in other ways.

Example 1 includes an apparatus to animate an artificial intelligence character consistently with a storyline. The example apparatus comprises a data tagger to tag data in a media data stream to generate a plurality of data files of tagged data. The data files correspond to different time periods in the storyline. The tagged data is associated with a first character in the media data stream. The artificial intelligence character is to portray the first character. The tagged data of respective ones of the time periods corresponding to at least one of a behavior of the first character, knowledge of the first character, a vocabulary of the first character, or an emotion of the first character. The example apparatus includes a trainer to generate a response model of the first character based on the data file corresponding to a current time period and one or more data files corresponding to one or more earlier time periods of the storyline. The example apparatus includes a response generator to apply the response model based on a stimulus input to animate the artificial intelligence character consistently with at least one of the behavior, knowledge, vocabulary, or emotion of the first character in the current time period of the storyline.

Example 2 includes the apparatus as defined in example 1, wherein the trainer is to identify, based on the data file corresponding to the current time period and one or more data files corresponding to one or more earlier time periods, a dataset including dialogue data for the first character, the trainer to generate the response model based on the dataset.

Example 3 includes the apparatus as defined in example 1, wherein the animation of the artificial intelligence character includes at least one of a speech pattern of the first character or an action performed by the first character corresponding to the at least one of the behavior, the knowledge, the vocabulary, or the emotion of the first character at the current time period.

Example 4 includes the apparatus as defined in example 1, wherein the tagged data includes dialogue data for the first character.

Example 5 includes the apparatus as defined in example 1, wherein the current time period is a first time period, the response model is a first response model, and the stimulus input is a first input, and the trainer is to generate a second response model of the first character based on the data file corresponding to a second time period of the storyline and the one or more data files corresponding to one or more earlier time periods of the storyline relative to the second time period, the second time period occurring after the first time period.

Example 6 includes the apparatus as defined in example 5, wherein the response generator is to apply the second response model to animate the artificial intelligence character consistently with at least one of the behavior, knowledge, vocabulary, or emotion of the first character at the time of the second time period of the storyline.

Example 7 includes the apparatus as defined in example 5, wherein the data file corresponding to the first time period includes first knowledge data and the data file corresponding to the second time period includes second knowledge data. The first knowledge data is at least partially different from the second knowledge data.

Example 8 includes the apparatus of example 5, wherein the data file corresponding to the first time period of the storyline and the one or more data files corresponding one or more earlier time periods of the storyline do not include the data file corresponding to the second time period.

Example 9 includes the apparatus of example 5, wherein the data files corresponding to the one or more earlier time periods of the storyline relative to the second time period include the dataset corresponding to the first time period.

Example 10 includes the apparatus as defined in example 1, wherein the stimulus input is one of a user input received by an artificial intelligence application or a cue generated by the artificial intelligence application.

Example 11 includes the apparatus as defined in example 1, wherein the tagged data includes first tagged data and second tagged data, in a data hierarchy.

Example 12 includes the apparatus as defined in example 1, further including a partitioner to partition the media data stream based on the time period.

Example 13 includes at least one non-transitory computer readable storage medium comprising instructions that, when executed, cause a machine to at least tag data in a media data stream to generate a plurality of data files of tagged data. The data files correspond to different time periods in the storyline. The tagged data associated with a first character in the media data stream. The artificial intelligence character is to portray the first character. The tagged data of respective ones of the time periods correspond to at least one of a behavior of the first character, knowledge of the first character, a vocabulary of the first character, or an emotion of the first character. The instructions, when executed, cause the machine to generate a response model of the first character based on the data file corresponding to a current time period and one or more data files corresponding to one or more earlier time periods of the storyline and apply the response model based on a stimulus input to animate the artificial intelligence character consistently with at least one of the behavior, knowledge, vocabulary, or emotion of the first character in the current time period of the storyline.

Example 14 includes the at least one non-transitory computer readable storage medium as defined in example 13, wherein the instructions, when executed, further cause the machine to identify, based on the data file corresponding to the current time period and one or more data files corresponding to one or more earlier time periods, a dataset including vocabulary data for the first character and generate the response model based on the dataset.

Example 15 includes the at least one non-transitory computer readable storage medium as defined in example 13, wherein the animation of the artificial intelligence character includes at least one of a speech pattern of the first character or an action performed by the first character corresponding to the at least one of the behavior, the knowledge, the vocabulary, or the emotion of the first character at the current time period.

Example 16 includes the at least one non-transitory computer readable storage medium as defined in example 13, wherein the tagged data includes dialogue data for the first character.

Example 17 includes the at least one non-transitory computer readable storage medium as defined in example 13, wherein the current time period is a first time period, the response model is a first response model, and the stimulus input is a first input, and the instructions, when executed, further cause the machine to generate a second response model of the first character based on the data file corresponding to a second time period of the storyline and the one or more data files corresponding to one or more earlier time periods of the storyline relative to the second time period, the second time period occurring after the first time period.

Example 18 includes the at least one non-transitory computer readable storage medium as defined in example 17, wherein the instructions, when executed, further cause the machine to apply the second response model to animate the artificial intelligence character consistently with at least one of the behavior, knowledge, vocabulary, or emotion of the first character at the time of the second time period of the storyline.

Example 19 includes the at least one non-transitory computer readable storage medium as defined in example 17, wherein the data file corresponding to the first time period includes first knowledge data and the data file corresponding to the second time period includes second knowledge data. The first knowledge data at least partially different from the second knowledge data.

Example 20 includes the at least one non-transitory computer readable storage medium as defined in example 17, wherein the data file corresponding to the first time period of the storyline and the one or more data files corresponding one or more earlier time periods of the storyline do not include the data file corresponding to the second time period.

Example 21 includes the at least one non-transitory computer readable storage medium as defined in example 17, wherein the data files corresponding to the one or more earlier time periods of the storyline relative to the second time period include the dataset corresponding to the first time period.

Example 22 includes the at least one non-transitory computer readable storage medium as defined in example 13, wherein the stimulus input is one of a user input received by an artificial intelligence application or a cue generated by the artificial intelligence application.

Example 23 includes the at least one non-transitory computer readable storage medium as defined in example 13, wherein the tagged data includes first tagged data and second tagged data in a data hierarchy.

Example 24 includes the at least one non-transitory computer readable storage medium as defined in example 13, wherein the instructions, when executed, further cause the machine to partition the media data stream based on the time period.

Example 25 includes an apparatus comprising means for tagging data in a media data stream to generate a plurality of data files of tagged data, the data files corresponding to different time periods in a storyline. The tagged data is associated with a first character in the storyline. The artificial intelligence character is to portray the first character. The tagged data of respective ones of the time periods corresponds to at least one of a behavior of the first character, knowledge of the first character, a vocabulary of the first character, or an emotion of the first character. The example apparatus includes means for storing the tagged data. The example apparatus includes means for generating a response of the artificial intelligence character to an input based on a response model of the first character. The means for tagging the data is to identify the data files corresponding to a current time period of the storyline and one or more data files corresponding to one or more earlier time periods of the storyline in the means for storing the data and generate the response model based on the identified data files.

Example 26 includes the apparatus as defined in example 25, wherein the means for tagging the data is to partition the media data stream based on the time period.

Example 27 includes the apparatus as defined in example 25, wherein the response includes at least one of an audio response or a visual response.

Example 28 includes the apparatus as defined in example 25, wherein the means for generating the response is to transmit the response to an artificial intelligence application.

Example 29 includes the apparatus as defined in example 25, wherein the tagged data includes data indicative of an action performed by the first character.

Example 30 includes a method for animating an artificial intelligence character consistently with a storyline. The example method comprises tagging, by executing an instruction with a processor, data in a media data stream to generate a plurality of data files of tagged data. The data files corresponding to different time periods in the storyline. The tagged data is associated with a first character in the media data stream. The artificial intelligence character is to portray the first character. The tagged data of respective ones of the time periods corresponds to at least one of a behavior of the first character, knowledge of the first character, a vocabulary of the first character, or an emotion of the first character. The example method includes generating, by executing an instruction with the processor, a response model of the first character based on the data file corresponding to a current time period and one or more data files corresponding to one or more earlier time periods of the storyline. The example method includes applying, by executing an instruction with the processor, the response model based on a stimulus input to animate the artificial intelligence character consistently with at least one of the behavior, knowledge, vocabulary, or emotion of the first character in the current time period of the storyline.

Example 31 includes the method as defined in example 30, further including identifying, based on the data file corresponding to a current time period and one or more data files corresponding to one or more earlier time periods, a dataset including vocabulary data for the first character and generating the response model based on the dataset.

Example 32 includes the method as defined in example 30, wherein the animation of the artificial intelligence character includes at least one of a speech pattern of the first character or an action performed by the first character corresponding to the at least one of the behavior, the knowledge, the vocabulary, or the emotion of the first character at the current time period.

Example 33 includes the method as defined in example 30, wherein the tagged data includes dialogue data for the first character.

Example 34 includes method as defined in example 30, wherein the current time period is a first time period, the response model is a first response model, and the stimulus input is a first input, and further including generating a second response model of the first character based on the data file corresponding to a second time period of the storyline and the one or more data files corresponding to one or more earlier time periods of the storyline relative to the second time period, the second time period occurring after the first time period.

Example 35 includes the method as defined in example 34, further including applying the second response model to animate the artificial intelligence character consistently with at least one of the behavior, knowledge, vocabulary, or emotion of the first character at the time of the second time period in the storyline.

Example 36 includes the method as defined in example 34, wherein the data file corresponding to the first time period includes first knowledge data and the data file corresponding to the second time period includes second knowledge data, the first knowledge data at least partially different from the second knowledge data.

Example 37 includes the method as defined in example 34, wherein the data file corresponding to the first time period of the storyline and the one or more data files corresponding one or more earlier time periods of the storyline do not include the data file corresponding to the second time period.

Example 38 includes the method as defined in example 34, wherein the data files corresponding to the one or more earlier time periods of the storyline relative to the second time period include the dataset corresponding to the first time period.

Example 39 includes the method as defined in example 30, wherein the stimulus input is one of a user input received by an artificial intelligence application or a cue generated by the artificial intelligence application.

Example 40 includes the method as defined in example 30, wherein the tagged data includes first tagged data and second tagged data in a data hierarchy.

Example 41 includes the method as defined in example 30, further including partitioning the media data stream based on the time period.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   interface circuitry to obtain first training data and second training data, the first training data indicative of one or more of a vocabulary, a behavior, knowledge, or emotions of a character in a first time period of a timeline for the character, the second training data indicative of one or more of the vocabulary, the behavior, the knowledge, or the emotions of the character in a second time period of the timeline, the first time period earlier in time than the second time period of the timeline;
   training software to generate a response model based on (a) the first training data and (b) the second training data;
   computer executable instructions; and
   processor circuitry to execute the computer executable instructions to:
      determine whether a user input is to invoke a response associated with the first time period or the second time period; and
      execute the response model to:
         cause an output device to output a first response based on the determination that the user input is to invoke a response associated with the first time period, the first response associated with the character, the first response different than the first training data and the second training data, the first response associated with the one or more of the vocabulary, the behavior, the knowledge, or the emotions of the character in the first time period; and
         cause the output device to output a second response different than the first response based on the determination that the user input is to invoke a response associated with the second time period, the second response associated with the character, the second response different than the first training data and the second training data, the second response associated with the one or more of the vocabulary, the behavior, the knowledge, or the emotions of the character in the second time period.

2. The apparatus of claim 1, wherein the processor circuitry is to cause the output device to portray the character in the first response and the second response.

3. The apparatus of claim 1, wherein the user input is a first user input, the response is the first response, and the processor circuitry is to:
   determine whether a second user input is associated with the first time period or the second time period, the second user input different from the first user input; and
   cause the output device to output the second response or a third response based on the determination that the second user input is associated with the first time period or the second time period.

4. The apparatus of claim 1, wherein the user input is a first user input, the response is the first response, and the processor circuitry is to:
  determine whether a second user input is associated with the first time period or the second time period, the first user input and the second user input are a same type of input; and
  cause the output device to output the second response or a third response based on the determination that the second user input is associated with the first time period or the second time period.

5. The apparatus of claim 1, wherein the processor circuitry is to base the first response on a context of the character.

6. The apparatus of claim 1, wherein the processor circuitry is to base the first response on a situation of the character.

7. The apparatus of claim 1, wherein the processor circuitry is to cause the output device to output the first response as an audio output.

8. The apparatus of claim 7, wherein the processor circuitry is to mimic a speech pattern of the character in the first response.

9. The apparatus of claim 1, wherein one or more of the first training data or the second training data includes tagged data from a media data stream, and the processor circuitry is to include dialogue data in the media data stream in the first response.

10. The apparatus of claim 1, wherein the character is a fictional character.

11. The apparatus of claim 1, wherein the character is a non-fictional character.

12. At least one non-transitory computer readable storage device comprising instructions that, when executed, cause at least one processor to at least:
  generate a response model based on (a) first training data indicative of one or more of a vocabulary, a behavior, knowledge, or emotions of a character in a first time period of a timeline for the character and (b) second training data indicative of one or more of the vocabulary, the behavior, the knowledge, or the emotions of the character in a second time period of the timeline for the character, the first time period earlier in time than the second time period;
  determine whether a user input is to invoke a response associated with the first time period or the second time period; and
  execute the response model to:
    cause an output device to output a first response based on the determination that the user input is to invoke a response associated with the first time period, the first response to portray the character, the first response different than the first training data and the second training data, the first response associated with the one or more of the vocabulary, the behavior, the knowledge, or the emotions of the character in the first time period; and
    cause the output device to output a second response different than the first response based on the determination that the user input is to invoke a response associated with the second time period, the second response to portray the character, the second response different than the first training data and the second training data, the second response associated with the one or more of the vocabulary, the behavior, the knowledge, or the emotions of the character in the second time period.

13. The at least one non-transitory computer readable storage device of claim 12, wherein the first response is an audio output and the instructions, when executed, cause the at least one processor to represent a speech pattern of the character in the first response.

14. The at least one non-transitory computer readable storage device of claim 12, wherein the user input is a first user input, the response is the first response, and the instructions, when executed, cause the at least one processor to:
  determine whether a second user input is associated with the first time period or the second time period, the second user input different from the first user input; and
  cause the output device to output the second response or a third response based on the determination that the second user input is associated with the first time period or the second time period.

15. The at least one non-transitory computer readable storage device of claim 12, wherein the user input is a first user input, the response is the first response, and the instructions, when executed, cause the at least one processor to:
  determine whether a second user input is associated with the first time period or the second time period, the first user input and the second user input are a same type of input; and
  cause the output device to output the second response or a third response based on the determination that the second user input is associated with the first time period or the second time period.

16. The at least one non-transitory computer readable storage device of claim 12, wherein the instructions, when executed, cause the at least one processor to base the first response on a context of the character.

17. The at least one non-transitory computer readable storage device of claim 12, wherein the instructions, when executed, cause the at least one processor to base the first response on a situation of the character.

18. The at least one non-transitory computer readable storage device of claim 12, wherein one or more of the first training data or the second training data includes tagged data from a media data stream and the instructions, when executed, cause the at least one processor to include dialogue data in the media data stream in the first response.

19. The at least one non-transitory computer readable storage device of claim 12, wherein the character is a fictional character.

20. The at least one non-transitory computer readable storage device of claim 12, wherein the character is a non-fictional character.

21. An apparatus comprising:
  memory;
  machine readable instructions; and
  processor circuitry to execute the machine readable instructions to:
    generate a response model based on (a) first training data indicative of one or more of a vocabulary, behavior, knowledge, or emotions of a character in a first time period of a timeline for the character and (b) second training data indicative of one or more of the vocabulary, the behavior, the knowledge, or the emotions of the character in a second time period of the timeline for the character, the first time period earlier in time than the second time period;
    determine whether a user input is associated with the first time period or the second time period; and
    execute the response model to:
      cause an output device to output a first response based on the determination that the user input is associated with the first time period, the first response to represent a personality of the character, the first response associated with the one or more of the vocabulary, the behavior, the knowledge, or the emotions of the character in the first time period; and cause the output device to output a second response different than the first response based on the determination that the user input is associated with the second time period, the second response to represent the personality of the character, the second response associated with the one or more of the vocabulary, the behavior, the knowledge, or the emotions of the character in the second time period.

22. The apparatus of claim 21, wherein the processor circuitry is to include a voice of the character in the first response.

23. The apparatus of claim 21, wherein one or more of the first training data or the second training data includes tagged data from a media data stream and the processor circuitry is to include dialogue data in the media data stream in the first response.

24. The apparatus of claim 21, wherein the processor circuitry is to base the first response on a context of the character.

25. The apparatus of claim 21, wherein the character is a fictional character.

26. The apparatus of claim 21, wherein the character is a non-fictional character.

* * * * *

UNITED STATES PATENT AND TRADEMARK OFFICE
CERTIFICATE OF CORRECTION

| | |
|---|---|
| PATENT NO. | : 11,475,268 B2 |
| APPLICATION NO. | : 16/921473 |
| DATED | : October 18, 2022 |
| INVENTOR(S) | : Jason Garcia |

It is certified that error appears in the above-identified patent and that said Letters Patent is hereby corrected as shown below:

In the Drawings

Sheet 4 of 8, in Field "402", in Figure 4, and on the title page, the illustrative figure, delete "PARITION" and insert --"PARTITION"--.

Signed and Sealed this
Twenty-seventh Day of December, 2022

Katherine Kelly Vidal
*Director of the United States Patent and Trademark Office*